US008390472B2

(12) United States Patent
Cornwall

(10) Patent No.: US 8,390,472 B2
(45) Date of Patent: Mar. 5, 2013

(54) RF METER READING SYSTEM

(75) Inventor: Mark K. Cornwall, Spokane, WA (US)

(73) Assignee: Itron, Inc., Liberty Lake, WA (US)

(*) Notice: Subject to any disclaimer, the term of this patent is extended or adjusted under 35 U.S.C. 154(b) by 835 days.

(21) Appl. No.: 11/991,677

(22) PCT Filed: Sep. 11, 2006

(86) PCT No.: PCT/US2006/035508
§ 371 (c)(1),
(2), (4) Date: Sep. 21, 2009

(87) PCT Pub. No.: WO2007/030826
PCT Pub. Date: Mar. 15, 2007

(65) Prior Publication Data
US 2010/0007521 A1    Jan. 14, 2010

(51) Int. Cl.
G08B 23/00    (2006.01)

(52) U.S. Cl. ........... 340/870.02; 340/870.3; 340/825.69; 379/106.03; 379/106.06; 379/106.07

(58) Field of Classification Search ............... 340/870.3, 340/870.02, 825.69; 370/335, 338; 375/130, 375/133, 134; 379/106.03, 106.06, 106.07
See application file for complete search history.

(56) References Cited

U.S. PATENT DOCUMENTS

| | | | | |
|---|---|---|---|---|
| 3,919,640 A * | 11/1975 | Simciak | ........................ | 375/269 |
| 5,056,107 A * | 10/1991 | Johnson et al. | ............... | 375/138 |
| 5,278,551 A * | 1/1994 | Wakatsuki et al. | ...... | 340/870.02 |
| 5,335,246 A * | 8/1994 | Yokev et al. | .................. | 375/133 |
| 6,014,089 A | 1/2000 | Tracy et al. | | |
| 6,088,659 A * | 7/2000 | Kelley et al. | ..................... | 702/62 |
| 6,150,955 A | 11/2000 | Tracy et al. | | |
| 6,369,719 B1 | 4/2002 | Tracy et al. | | |
| 7,336,200 B2 | 2/2008 | Osterloh et al. | | |
| 7,417,557 B2 * | 8/2008 | Osterloh et al. | ......... | 340/870.03 |
| 7,535,378 B2 | 5/2009 | Cornwall | | |
| 7,577,181 B2 | 8/2009 | Cornwall et al. | | |
| 2003/0048199 A1 * | 3/2003 | Zigdon et al. | ............ | 340/870.02 |
| 2005/0065743 A1 * | 3/2005 | Cumming et al. | .............. | 702/62 |
| 2005/0179561 A1 * | 8/2005 | Osterloh et al. | ......... | 340/870.02 |
| 2007/0057812 A1 | 3/2007 | Cornwall | | |
| 2010/0007521 A1 | 1/2010 | Cornwall | | |

* cited by examiner

Primary Examiner — Jean B Jeanglaude
(74) Attorney, Agent, or Firm — Dority & Manning, P.A.

(57) ABSTRACT

The automatic meter reading (AMR) systems and methods of the present invention facilitate meter reading utilizing one-way and two-way communication with utility meter endpoint devices while at the same time providing an operating regime that conserves energy for long battery life and utilizes the available airwaves for AMR communications efficiently. Embodiments of the invention are applicable in AMR systems employing handheld and/or vehicle-based mobile readers, fixed readers, and combinations thereof. Moreover, embodiments of the invention facilitate smooth transition from mobile AMR systems to fixed systems, and provide for automatic AMR system performance monitoring and automatic adaptability to maintain or improve performance.

68 Claims, 10 Drawing Sheets

SCM Packet Format

| BIT Content | Number of Bits | Fixed Value |
|---|---|---|
| Sync Bit (MSB) | 1 | 1 |
| Preamble | 20 | 0xF2A60 |
| ERT ID MS Bits | 2 | - |
| Reserved | 1 | - |
| Physical Tamper | 2 | - |
| ERT Type | 4 | - |
| Encoder Tamper | 2 | - |
| Consumption Data | 24 | - |
| ERT ID LS Bits | 24 | - |
| CRC Checksum (LSB) | 16 | - |

*FIG. 3A*

Versatile Packet Format

| BIT Content | Fixed Number of Bytes | Fixed Value |
|---|---|---|
| Training Synchronization Sequence (MSB) | 2 | 0x55 |
| Frame Synchronization Sequence | 2 | 0x16A3 |
| Packet Type ID | 1 | 0x1D |
| Message Type ID | 1 | |
| ERT ID | 1 | - |
| ERT Serial Number | 4 | - |
| Variable Length Message | - | - |
| Message CRC (Optional) | 0/2/4 | - |
| Packet CRC | 2 | - |

*FIG. 3B*

RF METER READING SYSTEM

RELATED APPLICATIONS

This application claims priority to PCT Application No. PCT/US2006/035508 filed Sep. 11, 2006, and U.S. patent application Ser. No. 11/222,657, filed Sep. 9, 2005, the disclosures of which are hereby incorporated by reference in their entirety.

FIELD OF THE INVENTION

The present invention is directed to automatic utility meter reading systems and, more specifically, is directed to an automatic utility meter reading system wherein the system synchronizes the reader to the endpoints and provides multipoint two-way meter reading.

BACKGROUND OF THE INVENTION

In radio-based automatic meter reading (AMR) systems, many utility meter endpoints need to be read by each reader. This type of communications arrangement is known as a point-multipoint system. One challenge in the design and deployment of such systems is ensuring that each endpoint device can be read reliably and as often as needed to meet the utility's billing cycle and measurement granularity requirements. Some utilities may wish to obtain hourly reads, for example, to monitor usage patterns. Certain utility providers may need to obtain consumption data from a large numbers of meters within a certain time window to determine its total "day take" of each most recent 24-hour period, for example.

Traditionally, AMR systems have utilized one-way endpoint devices that periodically transmit their consumption and related information as a "bubble-up" event. This type of transmission is known as a one-way system because the endpoint sends only outbound communications and does not receive any commands or acknowledgements from the reader. For ordinary remote reads, the endpoint has no way of knowing if its transmission has been received or if it needs to re-transmit a failed communication. Likewise, in systems wherein a reader is only occasionally within communication range of an endpoint, one-way endpoints have no way of knowing when a reader is present. One-way systems are designed such that endpoint devices transmit their messages from once every several seconds to once per minute. Because messages are transmitted so frequently, their length must be kept short to conserve energy in battery-powered endpoints. In addition, messages are preferably kept short to reduce the likelihood that messages will collide. This latter challenge exists regardless of whether endpoints are battery or externally powered.

Other known AMR systems utilize 1.5-way or two-way endpoint devices. One-and-one-half-way and two-way endpoints operate in a listen mode for most of the time. Reads are accomplished by interrogating specific endpoint devices by the reader. Collisions are reduced because endpoints within a reader's communication range can be interrogated one-at-a-time. In a 1.5-way system, an endpoint responds to a wakeup tone from a reader by transmitting its consumption and related information. In a two-way system, endpoint devices are responsive to various additional commands from the reader that may specify what type of information an endpoint should transmit, and that may configure operating parameters of the endpoint. One drawback of these two-way systems is the need for endpoints to operate in a receive mode (either frequently or continuously) in order to detect an interrogation signal or other command from the reader.

Another drawback of interrogation-based 1.5-way or two-way AMR systems is their incompatibility with the one-way systems described above, which are widely deployed. A simple one-way endpoint cannot detect or respond to an interrogation signal. Also, in areas where there might be simple one-way endpoints near interrogation mode endpoints, transmissions from the one-way endpoint would not be coordinated with those of the interrogation mode endpoints, resulting in an increased likelihood of message collisions. To date, no practical solution has been proposed that takes advantage of the power savings, backwards compatibility, and the other advantages of bubble-up systems, while enabling the more advanced functionality and remote configurability of interrogation mode systems.

Various AMR systems utilize hand-held readers and programming devices, vehicle-mounted readers, fixed location readers, and combinations thereof. Endpoints and readers among these different systems are preferably operated with different time periods between communication attempts, and different transmission power levels. As the size of a utility provider's customer base increases, the utility will tend to migrate from utilizing handheld readers to vehicle-based readers, and eventually to fixed reader systems. One challenge associated with making such a migration is the difficulty in re-configuring the AMR system devices to adjust their cooperating mode. Therefore, migration involves a substantial investment, not only in infrastructure upgrades, but in field labor.

SUMMARY OF THE INVENTION

The needs described above are in large part met by the meter reading system and method of the present invention. The meter reading system generally includes a reader and a utility meter endpoints. An intermediary repeater may also be used. In one embodiment of the invention, the endpoints bubble up to transmit an initial (short) message transmission of at least their identification. The endpoint then turns off its transmitter to save on battery power, and enters a listen mode for any instructions from the reader, such as, for example, such as a request for additional information. If the endpoint receives these instructions during its listen period, the endpoint responds as instructed. If the endpoint does not receive a response from the reader, the endpoint enters a sleep mode until its next transmit time to, once again, save batter power.

A method of this embodiment includes the steps of: (1) waking up each of the endpoints; (2) transmitting/bubbling up an initial message from each of the endpoints; (3) listening with the endpoint for a response from the reader; (4) listening by the reader for the initial message transmission; (5) upon the reader receiving the initial message transmission, requesting additional information from the endpoint; (6) upon receiving the request for additional information, transmitting the additional information requested from the endpoint; and (7) upon not receiving the request for additional information, entering a sleep mode with said endpoint until a next pre-programmed initial message transmission time.

Another embodiment of the invention provides for the endpoint to transmit a standard consumption message (SCM) via AM communication. Immediately, upon transmitting the AM communication, the endpoint transfers into a two-way, FM receive/transmit mode. When the reader receives the SCM, the reader requests additional information from the endpoint and the endpoint transmits that additional information via the two-way FM communication.

A method of one embodiment includes the steps of: (1) transmitting an SCM via AM transmission from the endpoint; (2) switching the endpoint into a two-way FM transmit/receive mode upon completing the AM transmission; (3) receiving the SCM with the reader; and (4) requesting additional information from the endpoint with the reader by two-way FM communication between the reader and endpoint.

In still another alternative embodiment of the present invention, the endpoint operates to save intervals of utility meter data. This interval data is capable of being transmitted by the endpoint in either AM or FM. In this instance, the reader, upon detecting the endpoint, transmits a command to the endpoint to send a predetermined number of intervals over a predetermined communication channel or channels.

BRIEF DESCRIPTION OF THE DRAWINGS

FIGS. 3A and 3B illustrate examples of messages that can be communicated in one-way communications and two-way communications modes according to various embodiments.

Figure 1:
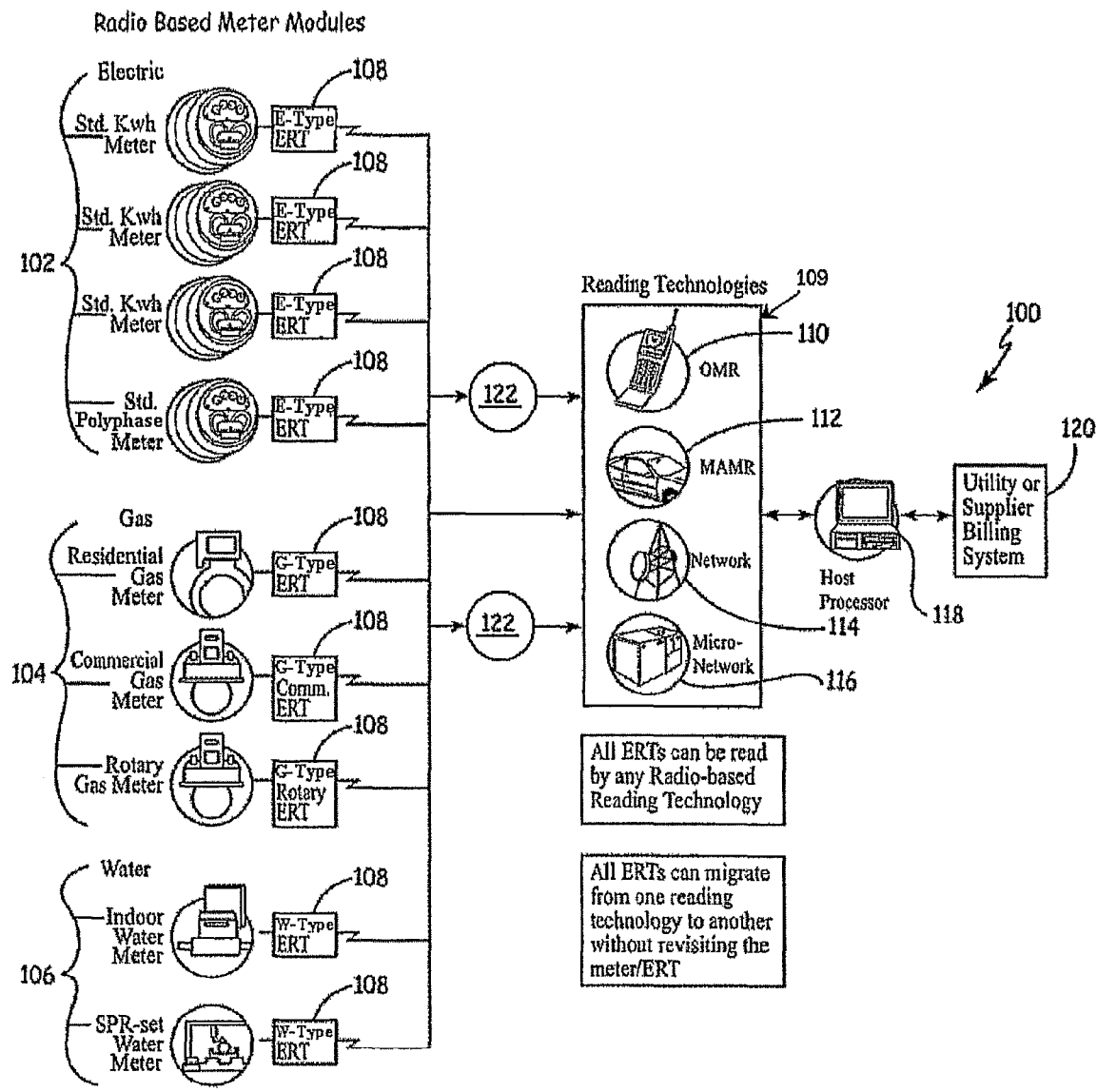
FIG. 1 depicts a radio-based automatic meter reading system that utilizes the data communication protocol according aspects of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

The automatic meter reading (AMR) systems and methods of the present invention facilitate meter reading utilizing one-way and two-way communication with utility meter endpoint devices while at the same time providing an operating regime that conserves energy for long battery life and utilizes the available airwaves for AMR communications efficiently. Embodiments of the invention are applicable in AMR systems employing handheld and/or vehicle-based mobile readers, fixed readers, and combinations thereof. Moreover, embodiments of the invention facilitate smooth transition from mobile AMR systems to fixed systems, and provide for automatic AMR system performance monitoring and automatic adaptability to maintain or improve performance.

In an automatic meter reading (AMR) system 100 of the present invention, as depicted in FIG. 1, the components generally include a plurality of utility or commodity consumption measuring devices including, but not limited to, electric meters 102, gas meters 104 and water meters 106. Each of the meters may be either electrically or battery powered, or both. AMR system 100 further includes a plurality of endpoints 108, wherein each corresponds to a meter. Endpoints 108 can be integrated into their corresponding meters, or can be separate devices communicatively interfaced with their corresponding meters. Each of the endpoints 108 includes a radio receiver/transmitter such as, for example, the Itron, Inc. ERT.

System 100 further includes one or more readers 109 that may be fixed or mobile. FIG. 1 depicts: (1) a mobile handheld reader 110, such as that used in the Itron Off-site meter reading system; (2) a mobile vehicle-equipped reader 112, such as that used in the Itron Mobile AMR system; (3) a fixed radio communication network 114, such as the Itron Fixed Network AMR system that utilizes the additional components of cell central control units (CCUs) and network control nodes (NCNs); and (4) a fixed micro-network system, such as the Itron MicroNetwork AMR system that utilizes both radio communication through concentrators and telephone communications through PSTN. Of course, other types of readers may be used without departing from the spirit or scope of the invention.

Further included in AMR system 100 is a system head-end, or host processor 118. Host processor 118 incorporates software that manages the collection of metering data and facilitates the transfer of that data to a utility or supplier billing system 120.

Automatic meter reading system 100 enables meter reading and two-way communications, including and command and control, between readers and endpoint devices, while maintaining backwards compatibility with existing ERT-based AMR infrastructure. In the two-way communications regime of system 100, a number of advantages are achieved by synchronizing reader 109 to endpoint 108, as opposed to the conventional method of synchronizing the endpoint to the reader.

Conventional two-way meter reading systems synchronize by having each endpoint listen for an initiation of communication by a reader, such as a reader-originated wakeup tone or command and control packet. Communication proceeds following the endpoint's reception of such initiating communication. In this type of arrangement, the endpoints must be on, and operating in a listening mode, for communications to be initiated. When an endpoint operates in a listening mode, but communications with the endpoint is not called for, the endpoint's operation results in a waste of energy, shortening the life of the endpoint if the endpoint is battery-powered. If a reader attempts to communicate with an endpoint when the endpoint is not in its listening mode, no such communication takes place, and the communication attempt results in a needless channel utilization, which, in turn, prevents the reader from communicating at least on that channel during the communication attempt. Additionally, the failed communication attempt clutters the channel, potentially causing collisions or interference with other AMR communications.

AMR Communications Overview

Figure 2:
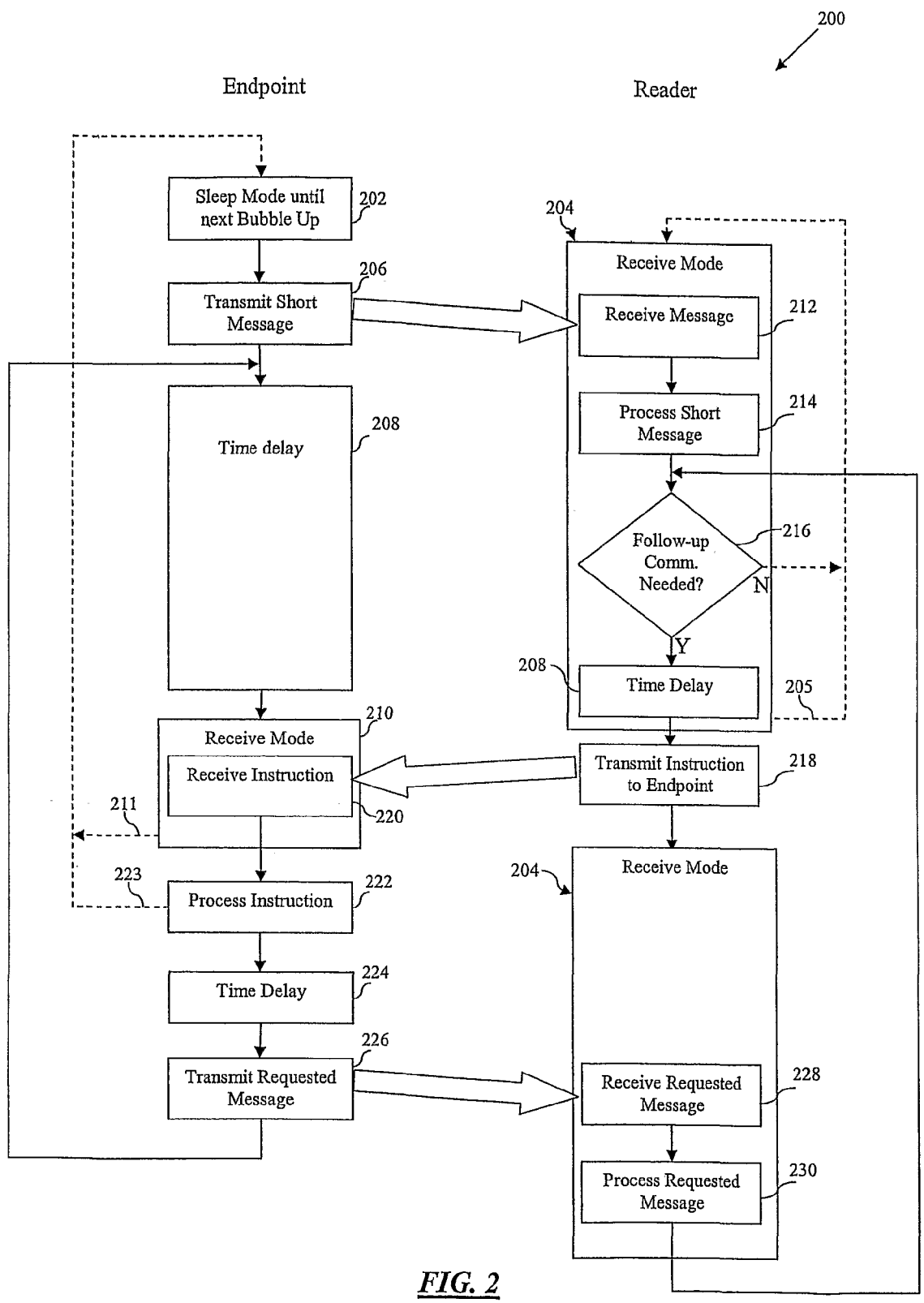
FIG. 2 is a flow diagram illustrating an AMR system communication session between an endpoint and a reader according to one embodiment of the invention.

FIG. 2 is a flow diagram illustrating an AMR system communication session 200 between endpoint 108 and reader 109 according to one embodiment of the invention. In contrast to the conventional two-way AMR systems described immediately above, endpoint 108 initiates each communication session and, within the communication session, reader 109 can selectively initiate two-way communications with endpoint 108. In one embodiment of system 100, each of the endpoints 108 operates in a low-power standby, or sleep, mode for a majority of the time, as indicated at step 202. While in this mode, some endpoints 108 may gather consumption information from their corresponding utility meters. Reader 109 normally operates in receive mode 204, in which it listens for transmissions from endpoint devices. As indicated at process flow 205, reader 109 remains in receive mode in the absence of communications activity.

In response to a specific event (such as, for example, the passage of a certain amount of time), endpoint 108 enters an active operating mode, or "bubbles up" and transmits an initial message, which is a relatively short message, such as burst of data, as indicated at step 206. By virtue of its short duration, the initial message requires a relatively small amount of energy to be transmitted by the endpoint. The initial message includes at least a unique identifier of the endpoint, and any necessary overhead bits that identify the initial message as a transmission from an endpoint device to enable its reception by an AMR system receiver. In one example embodiment, the initial message includes a synchronization pattern (such as a string of alternating bits), a preamble that is recognizable by a reader as indicating the presence of an AMR message, and an identification of the particular endpoint. In another embodiment, the initial message can include additional information, such as, for example, consumption information.

In a related embodiment, the initial message is a 96-bit standard consumption message (SCM) that is presently utilized in Itron Inc.'s ERT-based AMR systems. An example of a SCM format is illustrated in FIG. 3A. e.g., 21-bit preamble field followed by 2 ID bits, 1 spare bit, 2 physical tamper bits, 4 endpoint type bits, 2 encoder tamper bits, 24 consumption data bits, 24 ID bits, 16 CRC checksum bits (this can also be found in U.S. Pat. No. 4,799,059, which describes the ERT packet in detail). In related embodiments, the initial message is a variation of the SCM packet, such as having one or more additional fields, having fewer fields, or having differently-defined fields. In embodiments where the initial message is shorter than a SCM (such as omitting any consumption information), further 2-way communication with the endpoints is needed to obtain the consumption information; however, greater overall efficiency in communication and energy consumption may be realized with such an arrangement.

An AMR system in which endpoint devices wake from a standby mode to transmit a SCM is consistent with operation of present-day one-way ERT-based AMR systems. In this type of embodiment of system 100, endpoint 108 can work as a one-way endpoint with these existing systems without the need for upgrades or re-configuration of the readers and other AMR system infrastructure. Additionally, embodiments of readers according to the present invention can work conventional endpoint devices already deployed without any upgrades to the conventional endpoint devices.

After transmitting the initial message, endpoint 108 may sleep in a standby state for some specified amount of time, as indicated at step 208. In one example embodiment, the time of this delay is preset to about 1 second. In other embodiments, there may be no such delay; or the delay may be dynamically adjusted by the endpoint or configuration commands via the AMR system. Following the delay of step 208, endpoint 108 listens for a response from reader 109 for a predetermined duration of time, as indicated at step 210. Listening step 210 facilitates two-way communication between the endpoint and AMR system reader. As described below, if reader 109 is within communications range of endpoint 108 and needs to communicate with endpoint 108 following reception of the initial message, reader 109 transmits to endpoint 108 during the endpoint's listen period. If no two-way communication is initiated, communication does not take place and endpoint 108 returns to its bobble-up mode, as indicated at step 211. In an embodiment that utilizes frequency hopping for communications with endpoints, the next bubble-up event will involve the endpoint transmitting on a different channel.

In one embodiment, the listening duration is about 2 milliseconds. In various other embodiments, this listening time can be adjusted to any suitable duration to facilitate the desired operation and performance of system 100. In addition, the listening activity 210 of the endpoint can take place at the same frequency, or channel, on which the initial message was transmitted, or can take place at a different frequency that is predetermined, or formulaically derived based on specific conditions.

Prior to engaging in any two-way communications, at step 212, reader 109 receives the initial message transmitted by endpoint 108 at step 206. Reader 109 then processes the initial message at step 214. In one embodiment, processing the initial message includes decoding and parsing the initial message, reading certain fields or information carried by the initial message, and determining whether, and how, to respond to receipt of the message. As indicated at decision 216, the response can include initiating a follow-up communication (i.e. in two-way communications mode). The decision for whether to initiate further communication can be based on a variety of circumstances such as, for example, the content of the initial message received in step 212, system configuration instructions sent from the head end or host processor 118, the time of day or day of the billing cycle, the amount of time since the last successful consumption reading received from the particular endpoint 108, and the like.

At step 218, reader 109 transmits the follow-up communication as needed. In one embodiment, the follow-up communication is an instruction, such as, for example, a command requesting certain additional information from endpoint 108. In this scenario, according to one example embodiment, reader 109 reads the endpoint ID in step 214 when processing the initial message and, based thereupon, reader 109 decides whether to request the follow-up communication with that endpoint.

In a successful communication, step 218 occurs during the time that endpoint 108 is in its receive mode according to step 210. In one embodiment, reader 109 is synchronized with endpoint 108 (i.e., configured to automatically account for the time delay of step 208) to ensure that the follow-up communication transmitted in step 218 can be received. At step 220, endpoint 108 receives the follow-up communication from reader 109. Endpoint 108 then processes the communication at step 222, and initiates carrying out any instructions contained therein. If no further communication is called for, endpoint 108 returns to its standby mode of step 202. If the instructions received from reader 109 require a communicative response, endpoint 108 may sleep for a specified time duration at step 224, and then transmit the requested message at step 226, to be received by reader 109 at step 228.

According to various embodiments, the requested message is to be transmitted by endpoint 108 at a specific channel or frequency that is known by the reader. In one such example embodiment, the requested message is transmitted at step 226 on the same channel as the original initial message of step 206. In another example embodiment, the channel for transmitting the requested message is the same channel on which the instruction was received at step 220. In other embodiments, the transmission channel for the requested channel can be different.

The amount of information that is exchanged in the follow-up communication may be substantially greater than the amount of information transmitted by endpoint 108 in the initial message. For example, reader 109 may request a large amount of consumption data or status information from endpoint 108. In response to this type of request, endpoint 108 may transmit a 92-byte interval data message (IDM), a variable-length message packet on the order of 15-150 bytes, or can include a much longer composite message distributed over a plurality of separate packets. FIG. 3B illustrates a versatile message packet format that supports message typing and variable length messaging. The versatile message format depicted in FIG. 3B can accommodate a variety of different messages including, but not limited to, consumption data (including interval data), status information, alerts and alarm information, communications acknowledgements, information relating to endpoint or communications performance, and the like.

In one embodiment, the requested message can be implicitly requested incident to command and control. For example, endpoint 108 can be pre-programmed to respond to certain received command and control packets with an acknowledgement-type communication. In this example, the purpose of the command and control packet from the reader may not be to obtain data from the endpoint. Instead, the responsive communication from the endpoint serves to verify that the command and control instruction was received correctly and carried out by the endpoint.

Following transmission by endpoint 108 of the requested message at step 226, endpoint 108 sleeps for a delay period of step 208, and returns to its receive mode at step 210 to await any further instructions from reader 109. In one embodiment, endpoint 108 is pre-programmed with a specific default delay period for step 208. In a related embodiment, the requesting message from reader 109 sent at step 218 specifies a particular delay period that overrides the default delay. Reader 109 processes the received requested message at step 230, and determines if any further two-way communications are needed at step 216. If an additional instruction is to be sent to endpoint 108, the sequence described above is continued beginning at step 218.

By synchronizing the reader to the endpoint in communication session 200, the transmissions of the two-way communications are more likely to be successfully received. The two-way communications can be coordinated such that the receiver knows in advance at what time, and on what frequency, to listen for the endpoint's follow-up transmission. Additionally, the endpoint can be configured by the reader to listen during a certain time, or to transmit during a certain time known by the reader. As a result, fewer communications attempts are needed to deliver the messages having relatively large payloads (requiring more energy to transmit or receive). This permits operating the endpoint so that its power consumption is minimized. Fewer communication attempts saves energy, and results in a clearer channel, which reduces the chance of collisions with other data packets transmitted by other endpoints or AMR system devices. This, in turn, reduces the need for communications retries, keeping the channel clear and conserving energy at the endpoints.

Endpoint Side Communications Activity

Figure 4:
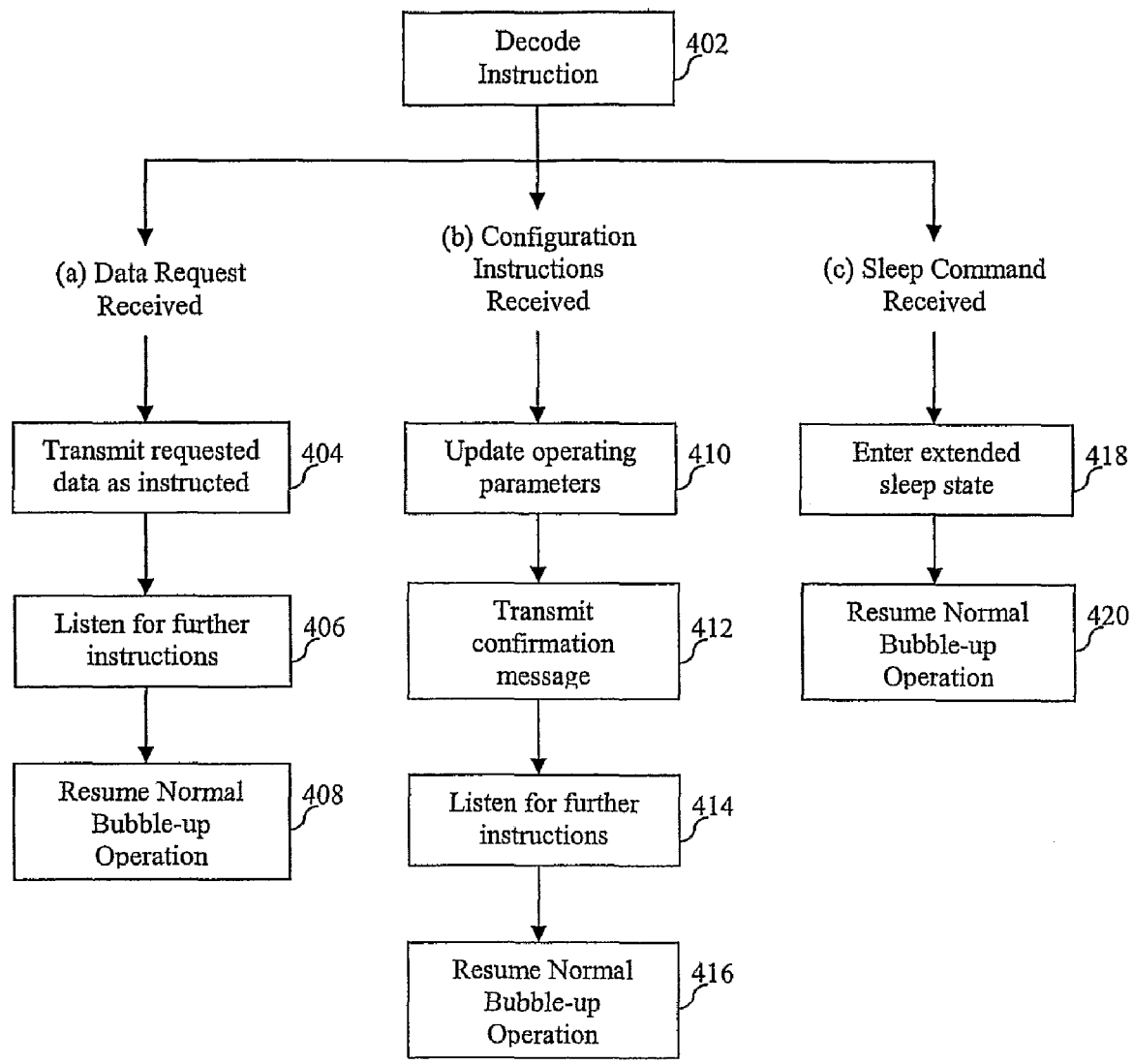
FIG. 4 is a decision tree diagram illustrating examples of the response by an endpoint to the initiation of two-way communications by a reader.

FIG. 4 is a decision tree diagram illustrating examples of the response of endpoint 108 to the initiation of two-way communications by reader 109. At step 402, the instruction transmitted by reader 209 that initiates the two-way communications (such as the instruction transmitted at step 218 in FIG. 2) is decoded. Three examples of possible instructions are illustrated: (a) the instruction may be a request for the endpoint 108 to transmit certain data (and, optionally, that the transmission be carried out in a certain specified manner); (b) the instruction may be a configuration or programming command to adjust some operating parameter of endpoint 108; or (c) the instruction may be a command to cause endpoint 108 to enter a specific mode of operation notwithstanding (i.e., overriding) the endpoint's default operating program.

In case (a) where the instruction is a request for data, endpoint 108 responds at step 404 by transmitting the requested data as instructed. At step 406, endpoint 108 listens for further instructions for a predetermined time duration. If no further instructions are received, normal bubble-up operation is resumed as indicated at step 408. In case (b), endpoint 108 may receive configuration instructions to update operating parameters. Endpoint 108 responds by updating the operating parameters at step 410 as instructed. At step 412, endpoint 108 transmits a message to reader 109 confirming the successful updating, and enters into a listening mode at step 414 to await possible further instructions. After the listening period, endpoint 108 returns to normal bubble-up operation at step 416. In case (c), endpoint 108 may receive an instruction to sleep for a specified duration of time. In response, at step 418, endpoint 108 enters a low-power sleep mode for the specified time. The time duration may be specified in various ways, as will be understood by persons of ordinary skill in the relevant art. For example, the sleep duration may be specified in terms of a real time duration, or a time of day as measured, for example, by a real time clock on board endpoint 108. Alternatively, the sleep duration may be specified in terms of a count value to be traversed by a counter on board endpoint 108 that runs while the endpoint is in its sleep mode. Following expiration of the time duration, endpoint 108 returns to its normal bubble-up operation as indicated at step 420.

In a related embodiments, reader 109 uses the follow-up communication to instruct endpoint 108 to operate in a certain fashion, or to adjust one or more configurable parameters of endpoint 108. For example, reader 109 can command endpoint 108 to enter a low-power standby mode for a certain time; or to preferentially utilize certain channels for future communications. In another related embodiment, a request for a further communication by reader 109 can include instructions on when, and how, to transmit the requested message in two-way mode. For example, referring again to FIG. 2, in step 218, reader 109 can specify the amount of time delay for step 224, and can specify the channel on which to transmit the requested message at step 226. In embodiments wherein endpoint 108 and reader 109 are synchronized in time and in frequency for communications, the follow-on communications have an increased probability of being successful, thereby reducing the likelihood of having to retry the communication. As will be discussed below, other aspects of the invention provide further techniques for improving the probability of successful communication.

Reader Side Communication Activity

Figure 5:
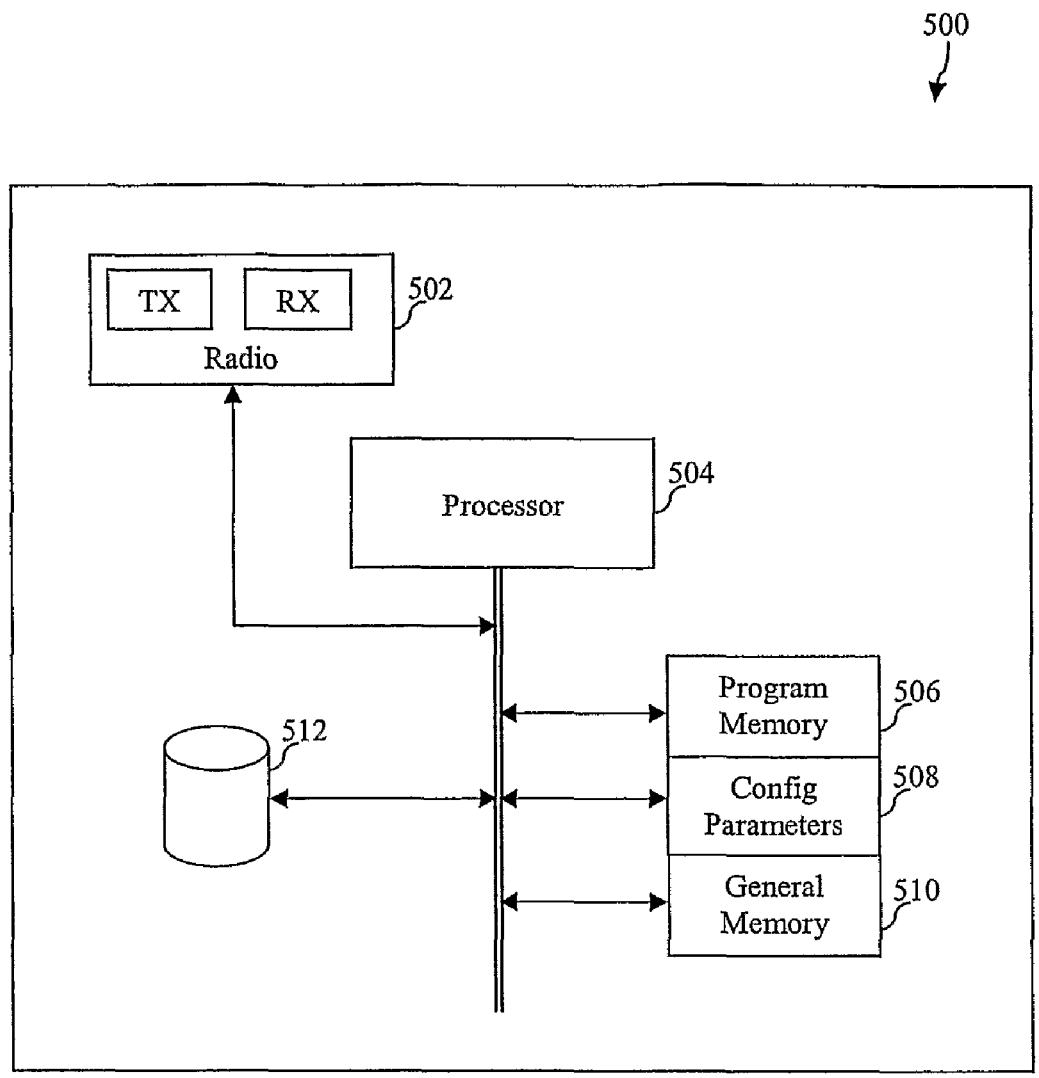
FIG. 5 is a block diagram illustrating a portion of the components of an AMR system reader according to one embodiment of the invention.

FIG. 5 is a diagram illustrating reader 500, which is an example embodiment of reader 109. Reader 500 includes a radio circuit 502. Radio circuit 502 is a half duplex or full duplex type radio that can transmit and receive. In one embodiment, radio circuit 502 can selectively transmit or receive signals using different modulation techniques. For example, radio circuit 502 can transmit and receive using amplitude modulation (AM) techniques, such as on-off keying (OOK), as well as using frequency modulation (FM) techniques, such as frequency shift keying (FSK), for example.

In one embodiment, radio circuit 502 is capable of receiving multiple channels simultaneously. For example, radio circuit 502 can utilize a broadband front end section that amplifies substantially the entire communications band. The broadband front end feeds a digital signal processor (DSP) circuit that is programmed to discriminate between individual channels using digital techniques. As will be appreciated by persons skilled in the relevant arts, this DSP-based channelization may be accomplished by a variety of known techniques. For example, the DSP may utilize a plurality of digital filters tuned to each channel. In another example, the DSP may implement a Fourier transform algorithm, such as fast Fourier transform (FFT) to represent the communication band in the frequency domain as a plurality of frequency bins, wherein each channel corresponds to at least one of the bins. The changing energy content of each channel as a function of time is indicative of received signaling on that channel. The receiver tracks the activity on each channel virtually simultaneously to detect the presence of, and recover, endpoint-originated transmissions. Radios of this type have been commercialized in the AMR field by Itron Inc., of Spokane, Wash., USA.

Processor 504 is a controller circuit such as, for example, a microcontroller, that coordinates the overall operation of reader 500. Processor 504 is interfaced with radio 502 via address/data bus or other suitable communicative coupling. Processor 504 is also interfaced with program memory space 506, which stores the main operating instructions of reader 500; configurable parameters memory space 508, which stores various adjustable settings; and with general memory space 510, which can store a variety of different data items during operation of radio 500.

Database 512, also interfaced with controller 504, stores data related to the reading and configuration of endpoints that can communicate with reader 500. The endpoint data stored in database 512 can include a list of endpoints to which reader 500 is assigned, and endpoint-specific information corresponding to each of those endpoints. Examples of such endpoint-specific information includes reading schedule(s) for when to obtain certain information from each individual endpoint, configuration and instruction information for adjusting operating parameters and establishing certain operating modes at certain times, respectively, for selected endpoints; the time of, or since, the last successful communication with each endpoint; received signal strength indication (RSSI) information corresponding to each endpoint; and the like.

When reader 500 receives an initial message from an endpoint, reader 500 decodes the initial message to determine the transmitting endpoint's unique ID. Reader 500 then looks in database 512 for a record matching the ID of the received initial message. If such a match is found, reader 500 will track the time and channel at which the initial message was received. This time and frequency tracking can include updating database 512 or general memory 510 according to the tracked time and frequency. In a related embodiment, reader 500 tracks the time elapsed since the receipt of the initial message. The elapsed time is used to synchronize a follow-up transmission to the endpoint's listen window during which the endpoint is receptive to instructions via two-way communications. For example, in the case where the endpoint sleeps for one second following transmission of its initial message and prior to activating its receiver, reader 500 would respond with a follow-up communication after the passage of one second, as measured by a timer on board reader 500.

During the passage of time following receipt of an initial message and before transmitting the follow-up communication, reader 500 continues operating its radio 502 to receive other transmissions from other endpoints in its communication range. Each received communication is tracked in time and frequency. In one embodiment, reader 500 implements a message transmission schedule (e.g., in database 512, or in general memory 510). The message transmission schedule represents the times at which follow-up communications to each endpoint are to take place. The message transmission schedule can also include information indicating which message to transmit to each corresponding endpoint. In one example embodiment, the message transmission schedule is implemented as a queue having time-stamped endpoint IDs. In another embodiment, the message transmission schedule is a queue of complete messages to be transmitted, each message corresponding to a time value. The time stamping or time value used to synchronize each follow-up communication with the receiving endpoint's reception window can be referenced to the reader's real time clock, or to a counter value representing the delay time duration between the reception of the initial message from the corresponding endpoint and the planned time for transmission of the follow-up communication to that endpoint.

In a related embodiment, the reader will not request a responsive message from an endpoint if the response channel has already been allocated. The missed endpoint ID can be kept in a priority list and it will have priority in the transmission schedule the next time an initial message is received from that endpoint.

In another embodiment, if the requested message was received by a reader from an endpoint, but the endpoint's message had errors, the reader could either wait until the next bubbled-up initial message or transmit a second request in the two-way sequence after the previous request. This transmit request in the ongoing sequence can continue so long as the applicable regulations governing channel use are complied with. For example, the "time on channel" rule set by the FCC limits the time of an endpoint/reader communication session to 400 ms in any 20-second time period for each endpoint.

In one embodiment, reader 500 reserves time slots for receiving requested messages from endpoints. Endpoints are instructed to schedule their requested message transmissions such that the transmissions occur during a reserved time slot. Reader 500 disables its transmitter from transmitting in the communications band during the reserved time slots. In an example embodiment where all endpoint devices are configured to sleep for the same predefined time duration between the initial message transmission and the receiver operation, the reserved time slots for receiving long messages occur periodically according to the predefined time duration. In one such embodiment, the delay time between initial message transmission and listen mode for endpoints is one second. In this case, the reserved time slots at receiver 500 can be at the beginning of each 1-second block of time. The duration of each reserved time slot can account for the length of time needed to transmit the longest possible requested message, plus some buffer time to improve tolerance of timekeeping resolution errors between receiver 500 and any of the endpoints.

In a related embodiment, for each block of time, a plurality of time slots for receiving requested messages is reserved. Certain reserved time slots may be assigned to requested messages to be received on certain channels, while other reserved time slots may be assigned to different channels. As an example of this embodiment, for each periodic block of time, a first reserved time slot may be assigned to even-numbered channels, and a second reserved time slot may be assigned to odd-numbered channels. This arrangement ensures that requested endpoint transmissions are not received simultaneously on adjacent channels, thereby improving channel selectivity, improving the tolerance of receiver 500 to frequency drift of endpoint devices, reducing the likelihood of inter-channel interference, and, ultimately, improving the likelihood that the requested messages are received successfully. In a variation of this embodiment, there may be three separate reserved time slots assigned respectively to every third consecutive channel.

Figure 6:
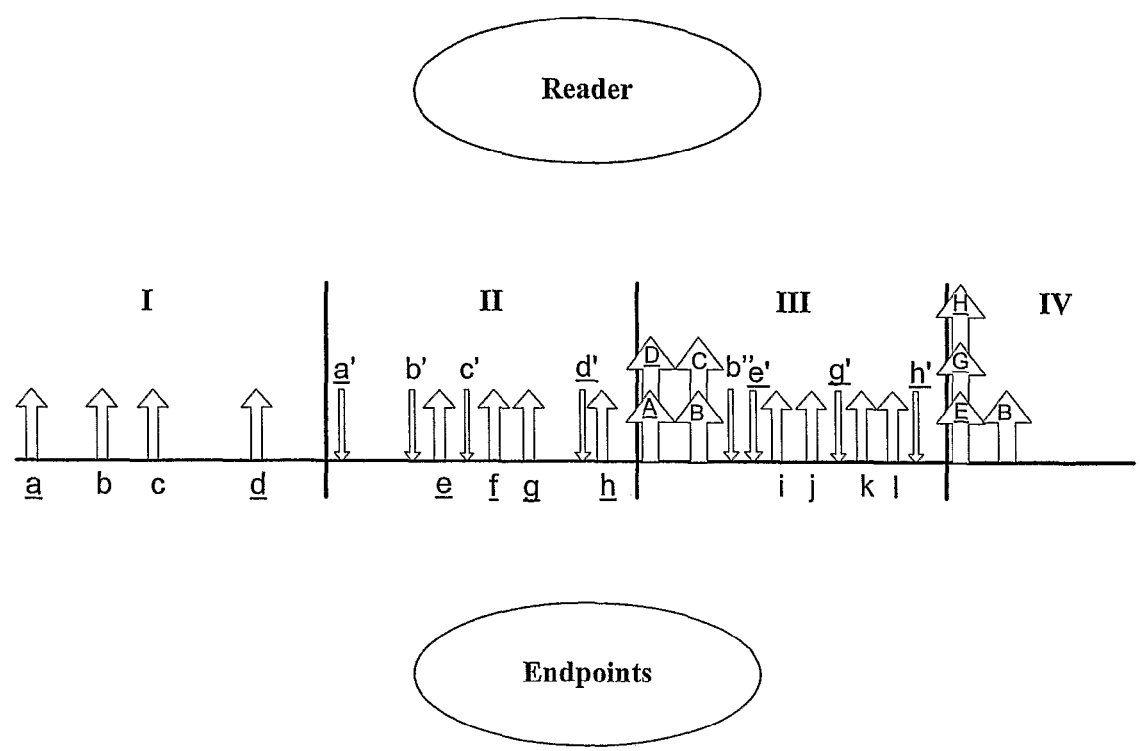
FIG. 6 is a timing diagram illustrating two-way communications between a reader and a plurality of endpoints during four consecutive blocks of time I-IV according to one example embodiment.

FIG. 6 is a timing diagram illustrating two-way communications between reader 500 and a plurality of endpoints during four consecutive blocks of time I-IV. The arrows represent message transmissions between the reader and the endpoints; and the direction of each arrow indicates the direction of transmission (whether from reader 500 to the endpoints, or vice-versa). In time block I, initial messages a b, c, and d are transmitted by four respective endpoint devices. Messages corresponding to reference letters that are underlined in FIG. 6 correspond to messages that are transmitted on even-numbered channels. For instance, initial messages a and d are on odd-numbered channels; whereas initial messages b and c are on even channels.

In time block II, the reader responds with commands requesting messages in the next interval. The responses directed individually to each of the four endpoints are indicated at a', b', c', and d', respectively. In this example, every endpoint operates with the same time delay, one second, for example, between initial message transmission and listen mode. Therefore, each of the reader's responses a', b', c', and d', is sent with the same time delay, e.g., one second, after the corresponding initial message was received. Also, during time block II other endpoint devices transmit their respective initial messages e, f, g, and h. The reader continues to monitor the communications band when it's not transmitting and picks up initial messages e, f, g, and h.

In this example, there are two reserved time slots near the beginning of each time block for receiving requested messages. Each of responses a', b', c', and d' instruct the respective endpoint to transmit its requested message such that the requested message is received during the appropriate reserved time slot. Requested messages A and D are transmitted on their respective even channels in the first reserved time slot, requested messages B and C are transmitted on their respective odd channels in the second reserved time slot. In a variation of this embodiment, any of responses a', b', c', or d' can instruct the respective endpoint to transmit its requested message on a specified channel or at a specified reserved (or unreserved) time slot.

In time block III, the reader responds to initial messages e, g, and h (not f) with commands e', g', and h' requesting data. Also, the reader responds to requested message B by requesting further data, as indicated at b". Additionally, during time block III, the reader receives initial messages i, j, k, and l. Requested messages E, G, H are transmitted by their respective endpoints on even channels in the first reserved time slot in time block IV. Requested message B is transmitted in the second reserved time slot on its odd channel. If the reader requires additional operations from any endpoint, it will transmit the request according to the endpoint's configured time delay following the previous reader request.

In another embodiment, the reader instructs multiple endpoints to transmit their requested messages at the same time, but on different channels, without having any of the channels reserved in advance. In this embodiment, the reader dynamically coordinates the channel assignments and scheduling in real time.

Two-Way Command and Control Functions

Table 1 below presents various examples of programming commands. Table 2 presents various examples of data requests.

TABLE 1

| Program Commands |
| --- |
| Set time/synchronize RTC |
| Schedule Audit Mode/GDT Mode |
| Set Bubble-up rate |
| Set TX power/Set TX Modulation |
| Set time duration for |
| |
| Sleep |
| Pause after SCM before listen |
| Pause after download before TX |
| Pause after TX before listen |
| Set default packet type |
| Channel utilization plan/Set default programming frequency |
| Set encryption parameters |
| Reset to factory setup |

TABLE 2

| Data Request Commands |
| --- |
| Specify intervals |
| |
| Rows/columns |
| Evenly spaced in specified time range |
| Specify natural duration and get last x intervals of specified duration |
| Move in/Move out info |
| Gas day take info |
| RSSI |
| Encrypted messages |
| Interrogate programming fields |
| Battery voltage/Temp |
| Tamper report |
| Query specific memory location |

These examples of two-way commands and data requests facilitate a number of techniques for improving AMR system performance, such as endpoint battery life, probability of successful data communications, ease of installation/upgradeability, migration from handheld mobile to vehicle-mounted mobile to fixed networks, obtaining a wide variety of interval consumption data from endpoint devices with minimal communications overhead, enabling special operating modes for facilitating system audits and daily take measurements, and the like.

Adjusting Operating Mode for Endpoints

In one embodiment, readers can selectively place individual endpoints in certain operating modes. One example of such an instruction is the sleep command described above. In this mode, the endpoint sleeps for a preconfigured, instructed, or otherwise predetermined duration of time, then returns to its normal bubble-up operation. The sleep mode is useful for systems where further reads from the endpoint are not needed for some time after a successful communication. This may be especially useful in mobile readers. After collecting the needed data from each endpoint, that endpoint can be instructed to sleep. When this command is applied to every read endpoint, the result is a "trail of silence" behind the mobile reader. Endpoints that have been read no longer bubble up, which clears the communication band of unneeded transmissions that might otherwise cause data collisions, necessitating re-tries and further cluttering the air waves. Since the likelihood of data collisions is reduced, the sleep command can enable the use of longer messages for transferring more consumption intervals and other additional information. The time duration of the sleep mode can be configured to ensure that the reader is well out of communications range of the sleeping endpoint before it self-awakens by returning to its normal bubble-up mode.

In a fixed network embodiment, sleep mode may be employed to reduce the density of bubbling-up endpoints. For example, in a neighborhood having endpoints A, B, C, D, E, and F, in close proximity to one another, the group of endpoints A, C, and E can be alternately operated in their normal bubble-up mode with respect to the group of B, D, and F. This technique reduces the chance of message collisions. Another benefit of the sleep mode is that it conserves battery life for internally-powered endpoint devices. For endpoint devices on a strict reading schedule, if supplementary reads are not needed between scheduled reads, the endpoint may be instructed to sleep until the next scheduled reading window.

Another example of a configurable temporary operating mode is a mode of increased endpoint activity. For example, in mobile network systems, a utility provider may desire to conduct follow-up reads to collect additional information from certain endpoints following a general reading pass of a particular neighborhood. In such a system, endpoint devices may be configured to increase their bubble-up rate or their transmission power in a certain time window to increase the probability that a possible follow-on read attempt will be successful. In situations where follow-on reads are likely to occur in a time window beginning after a certain period, such as after several hours, and ending at the end of the next business day, the increased activity mode may be scheduled to begin and end to coincide with the time window. If reads are unlikely to take place in the time period after the last read and before the start of the time window for taking follow-on reads, endpoints may be commanded to sleep until the start of the increased bubble-up activity. At the conclusion of the follow-on read window, the endpoints automatically return to their default bubble-up mode.

Another use of increased bubble-up activity is in facilitating day take, which is a reading taken by an endpoint at a specific time of day—for instance, the consumption reading taken at 9:00 AM. Gas utilities often use gas day take across a system to monitor daily usage of gas in their system. Typical requirements are to read all of the GDT meters is a system within a few seconds to a minute of the specified hour and then take no longer than 1 hour to deliver the reading to the utility.

The two-way communications of the present invention enable programming the GDT time in the endpoint, and synchronizing the endpoint's real time clock to the network or UTC time. In one embodiment, when the GDT time occurs in the endpoint a reading is taken and then stored in the endpoint. This GDT reading is then transmitted in a bubble up fashion for 15 transmissions, at the standard bubble up rate the endpoint was previously running on, to permit multiple transmissions for good read reliability performance. Unlike usual bubble-up operation, which may involve the endpoint transmitting a new measurement from one bubble-up event to the next, the GDT mode in one embodiment repeatedly transmits the GDT value at every bubble-up event occurring while the endpoint is in GDT mode.

After the 15 transmissions, the endpoint will then return to its normal bubble-up mode. When the endpoint transmits the GDT to the fixed network reader the GDT consumption is transmitted along with the current time of the endpoint given in the time since midnight. If the time is out of specification for getting GDT then the endpoint will be sent a new time from the fixed network reader.

A further example of operating mode adjustment that is afforded by the two-way communications aspect of the invention is adjusting operating parameters to facilitate migrating the AMR system from one reader type to another. Endpoints can be configured to bubble up slower in a fixed network installation than in a mobile system. Additionally, the transmission power may be set higher in a fixed network when the bubble-up rate is slower.

Channel utilization is governed by different regulations throughout the world. Each utility provider system can set and modify endpoint behavior for migrating their AMR systems to comply with the regulations applicable to it. In one example embodiment, the two-way communications are used to selectively reconfigure endpoint devices to operate under FCC Part 15.247 rules, or under 15.249 rules based on the desired level of performance, the length of messages being transmitted, the measured communication performance (e.g., RSSI) associated with communication with certain endpoints, the measured channel conditions (e.g., noise floor or interfering signals), and the like.

In one example embodiment, endpoints may be programmed to bubble at a slow rate of one a minute until a monthly read time. Then, the endpoints would bubble up faster for a few days or until they are read. At that time, the endpoints would be set to bubble slowly again. This approach keeps endpoints available for unscheduled reads and, at the same time, conserves battery power and channel clarity.

Coordination of Communication Channels

As described above, the two-way exchange between reader and endpoint can take place on the channel of the original initial message transmission, or can utilize different channels. In embodiments in which different channels are used for a particular two-way communication sequence, a variety of approaches may be utilized for coordinating the channel hopping. For example, the listening channel can be algorithmically determined in some fashion, defined according to a specified channel hopping sequence known by both the endpoint and reader, or based on a predefined logical relationship to certain circumstances. This can provide some degree of security from eavesdropping by an unauthorized receiver that does not know the hopping sequence. In a related embodiment, the listening channel can be derived based on the value of a certain data field of the most recently transmitted message (e.g., step 206 or step 218 of FIG. 2) according to a known derivation algorithm.

In one example embodiment, the endpoint controls the channel hopping sequence. For example, each transmission by the endpoint, such the initial message or requested message, can include a field indicating the frequency the endpoint's receiver will be listening to. In a related embodiment, each transmission (whether from an endpoint or from a reader) will indicate the channel on which to transmit a responsive message. In another embodiment, the reader takes control of the channel selection when it initiates two-way communications. For example, the reader can specify the frequency on which the endpoint should transmit each of its messages.

In embodiments where the reader controls channel selection, the reader can coordinate the activity of different endpoints to manage the utilization of the communication band. This degree of control can be used advantageously to avoid collisions. In one example embodiment, in a mobile system, a reader uses two-way communications to transfer a channel hopping schedule to each endpoint. Each endpoint's channel hopping schedule can be unique to that endpoint, and can be designed to make certain that endpoints that are located within a reader's communication range operate at different frequencies.

In one embodiment, the reader is adapted to detect whether the frequency of the endpoint's transmission has drifted from the center frequency of the channel on which the endpoint is transmitting. For example, in a software-based radio such as the example embodiments described above, the receiver's radio can recognize if the energy of a received signal is appearing simultaneously in adjacent frequency bins. This suggests that the endpoint's transmission is not centered at the channel's frequency. In a subsequent message to the endpoint, the reader can include a command to the endpoint to correct its channel definitions.

In another type of embodiment, other techniques of spectrum spreading may be utilized such as, for example, fast frequency hopping (i.e., changing frequencies at a rate that is faster than the data rate), or direct sequence spread spectrum (DSSS) techniques. Persons of ordinary skill in the relevant art Alarm/Error Handling and Call Back Conditions In one embodiment, an endpoint can include certain alarm or error flags in its initial message. The reader examines each initial message for the presence of such flags and, if any alarm or error conditions are present, the reader can respond in some special manner. For example, the reader may request the endpoint to return the settings of certain configuration parameters, or may command the endpoint to return the contents of a specific memory space and registers. As another example, the reader may treat certain error or alarm flags received from endpoints as call back conditions under which to communicate the presence of the alarm or error to the head end at the earliest opportunity.

If the endpoint 108 is on a meter, such as a gas meter, and all that is required are simple, once-a-day consumption reads, then the endpoint 108 transmission packet may also confirm the data and may bubble less often to conserve the battery. The packet can include a cyclical redundancy check (CRC). Once the transmission packet is received by the reader 109, and if the reader 109 wants more information such as obtaining tamper data, or to perform various functions such as resetting a register, setting timing, or adjusting frequency, the reader 109 is able to carry on a two-way interchange by transmitting the request when the given endpoint 108 is listening.

Information Gathering and Decisions Based on Channel Conditions

According to one aspect of the invention, readers or endpoints measure and indicate the received signal strength (RSSI) for received transmissions. In one such embodiment, a receiver measures the RSSI for each received initial message. If the RSSI is below a certain predefined threshold, achieving a successful 2-way communication may be less likely than desired, resulting in retries, waste of energy in battery-powered endpoints, and channel clutter. The receiver can determine, based on the RSSI of a received initial message, whether to initiate two-way communications with that endpoint. By selectively communicating only with endpoints that appear to be communicating well, overall system performance can be improved, and wasteful failed transmissions can be substantially reduced.

Conversely, if a first communication from a an endpoint is received with a particularly good RSSI (e.g., better than the average RSSI value associated with the endpoint), the reader can request more data than it normally would. For example, the reader may request more interval data with a higher granularity (e.g., 80 10-minute intervals as opposed to 40 20-minute intervals). More generally, the extent of two-way communications may be dynamically selected by the reader based on the RSSI values of the transmissions from the endpoint.

In a mobile collection embodiment, a reader can compare an RSSI value associated with the most recently received initial message from a certain endpoint with that of the previous initial message from the same endpoint. As the reader approaches the endpoint, the RSSI value is expected to increase. Using this information, the reader may predict if an endpoint's RSSI is likely to improve in soon-to-be-received initial messages. The reader may thus elect to wait until a later time to initiate two-way communications with that endpoint. In a related embodiment, the reader can identify a "best available" initial message from an endpoint which is sending initial messages having lower than desired RSSI values. For example, consider initial messages received from such an endpoint having the following RSSI values under the desired minimum threshold of 0 dB: −12 dB, −6 dB, −3 dB, −4 dB. Based on these values, future initial messages are not likely to be significantly better than the most recent value of −4 dB. Therefore, the endpoint may elect to initiate the two-way communication with this endpoint following receipt of the next initial message from the endpoint.

In a related embodiment, the reader maintains records of past RSSI measurements for each endpoint, or passes on the RSSI information to the head end for maintenance of this information. Certain RSSI trends may prompt the AMR system to adjust the way information is collected from certain endpoints. For example, in mobile systems, the route of the mobile reader may be adjusted, or an endpoint may be re-assigned to a different data collection route or reader. In a fixed system, a repeater may be placed to improve communications with certain endpoints in certain areas.

In one embodiment, fixed readers collect record of every endpoint that is in range, together with the RSSI values associated with each of those endpoints, and provide this list to the head end. Certain endpoints may be within communications range of more than one receiver. The head end can determine which of these endpoints transmits to which reader with the best RSSI, and, for each endpoint, instruct the best reader to add that endpoint to its list of endpoint with which to initiate two-way communications. For readers that receive initial messages from certain endpoints at a lower RSSI than received by other readers at higher RSSI, these readers can be instructed to disregard initial messages from those endpoints. In a related embodiment, readers can communicate with one another to arbitrate which endpoints are to be associated with which receiver based on the RSSI values.

In one embodiment, if an endpoint's RSSI value is lower than desired, that endpoint may be instructed or programmed to increase its transmission power for the two-way communication, or to bubble up more frequently. In such cases, the utility provider may be advised by the AMR system to add additional battery capacity to the endpoint to support the higher levels of activity, thereby preserving the desired useful life of the endpoint. In a related embodiment, if an endpoint's RSSI value is significantly higher than needed for reliable communications, that endpoint may be instructed to reduce its transmission power.

In another related embodiment, endpoints maintain records of RSSI values of received reader-originated transmissions. Readers may instruct endpoints during the two-way communications to transfer their maintained RSSI values. This information can be passed to the head end for system performance analysis. Certain decisions based on this information can also be made by the readers. For example, in one embodiment, a reader may determine whether or not to transmit lengthy configuration information to an endpoint that is receiving a relatively weak reader messages.

Besides measuring RSSI values, readers or endpoints can measure channel clarity, and make certain decisions based on this information. In one example embodiment, a reader takes measurements of the noise floor of different channels during times of idle communications. In fixed networks, such information may be used to characterize the communication band as a function of time of day. If certain times of the day routinely exhibit reduced channel clarity on certain channels, the reader may adjust its operation to avoid communications on those channels. The reader may disregard initial messages occurring on unclear channels, or the reader may attempt to instruct endpoints using the two-way communications to preferentially utilize clearer channels. In mobile networks, readers may characterize channel clarity as a function of time of day and of geographic location. Such information may be used to adjust the reader's operation similarly to the examples described above. In addition the reader's route may be adjusted to avoid certain dead spots, for example.

In a related embodiment, the reader measures channel clarity during the time duration following receipt of an initial message from an endpoint and the reader's communicative response thereto. If a channel is less clear than a predetermined threshold, the endpoint may be instructed to change channels, or to re-initiate communications at its next bubble-up event on a different channel before requesting long message transmissions from the endpoint.

In another embodiment, the endpoints can measure channel clarity by listening on the next channel prior to initiating communications with an initial message transmission. If that channel is noisy, the endpoint may decide to avoid transmitting its initial message on that frequency. The endpoint may then switch to a new channel, and repeat the clarity measurement prior to initiating communications. Endpoints may log measured channel clarity as a function of time, and pass this information to the reader using the two-way communications when so requested.

Repeaters

Referring again to FIG. 1, a repeater 122 may be used in the system 100 and, if so, in one embodiment, the repeater 122 can function much like an endpoint. For example, repeater 122 may operate in a low-power standby, or sleep, mode for a majority of the time, and may bubble up with an initial message directed to the main reader 109 similarly to the way an endpoint 108 operates. After the initial message transmitted by repeater 122 is acquired by the main reader 109, reader 109 may instruct repeater 122 to transmit a list of endpoints within it communication range. The repeater follows this instruction by enabling its receiver for some predetermined period of time, and logging the endpoint IDs of endpoints transmitting initial messages that are received by repeater 122.

Subsequently, repeater 122 bubbles up to initiate a communication with reader 109. Reader 109 initiates two-way communication with reader 122 similarly to the procedure described above with reference to FIG. 2. In two-way communications mode, repeater 122 sends the IDs of the detected endpoints to reader 109. Reader 109 determines which of these endpoints the repeater 122 should track.

Repeater 122 may also monitor and record RSSI information similarly to the techniques described above. The RSSI information can be used by either the repeater, the reader, or the head end to instruct the repeater 122 and/or the reader 109 how to operate with respect to each of the endpoints.

Reader 109 communicates a command to repeater 122 to instruct repeater 122 to collect data from those endpoints. The repeater 122 then synchronizes itself to those endpoints 108. When the reader 109 desires a reading, it passes a command to the repeater 122 to collect reads. The repeater 122 passes this command to the endpoints 108. Once all of the reads are collected, the repeater 122 passes them up to the reader 109.

In another configuration, the reader 109 passes an endpoint ID list and a reading schedule to the repeater 122. Repeater 122 communicates with the endpoints on the list, and logs their consumption and related data in a database. When asked for end point reads, the repeater 122 sends the most recent readings from its database for each endpoint. This method has the latency of the bubble time interval of the endpoint 108 plus the reading cycle of the repeater 122.

In one type of embodiment, the repeater 122 is battery powered. A repeater 122 of this type can sleep when it is not required to get data from the endpoints 108. Repeater 122 can wake at predetermined intervals to bubble up to reader 109 and to listen for its endpoints 108. If a short latency is required, the repeater 122 can operate a timer to synchronize to the scheduled bubble-up times of endpoints 108. If latency is not an issue, the repeater 122 is able to turn on its receiver once an hour, for example, for a time duration long enough to read its endpoints 108, (e.g., 20 seconds for endpoints bubbling up more rapidly).

Figure 7A:
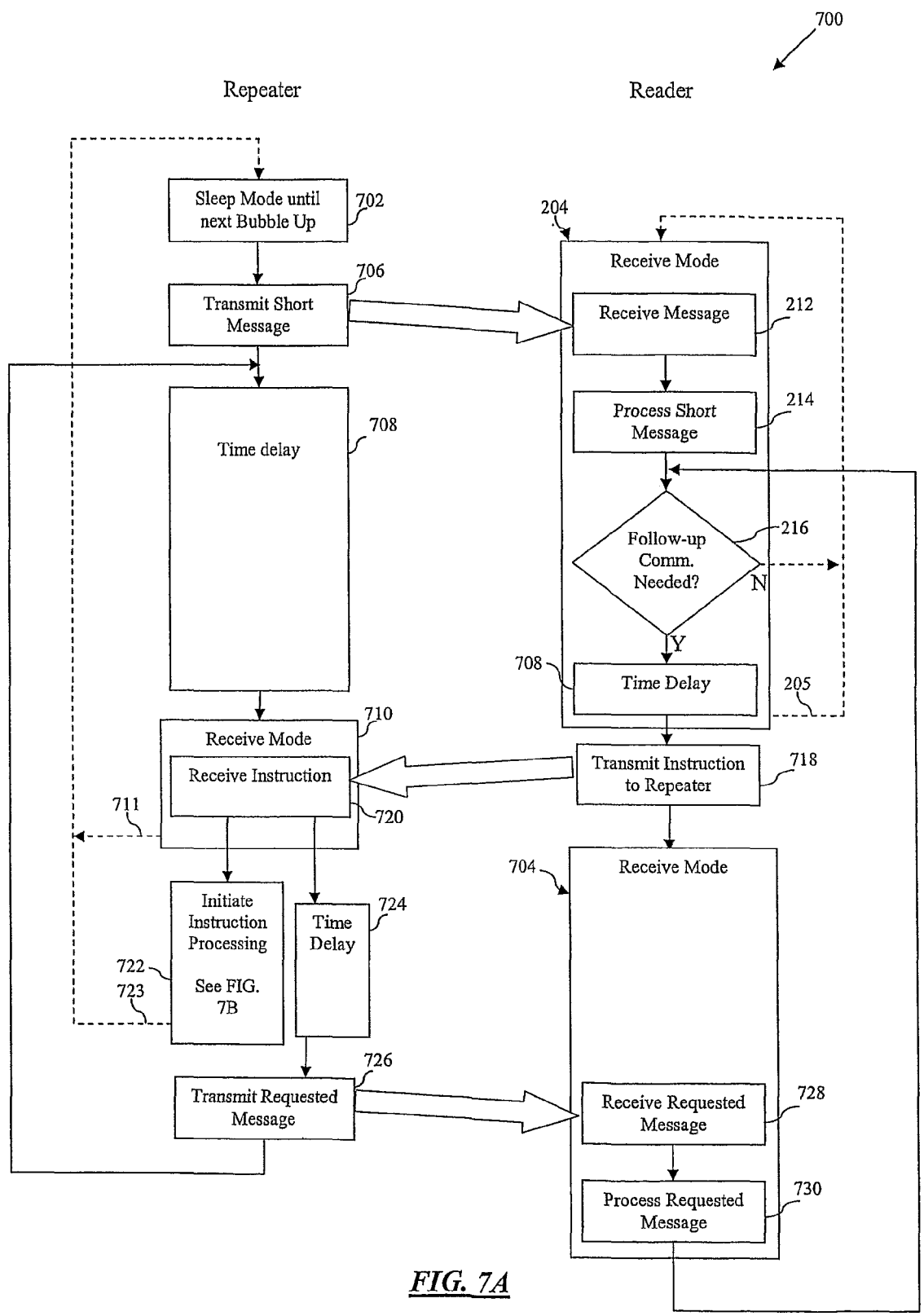
FIGS. 7A and 7B are flow diagrams illustrating an example communication sequence involving a reader, an endpoint, and a repeater according to one aspect of the invention.
Figure 7B:
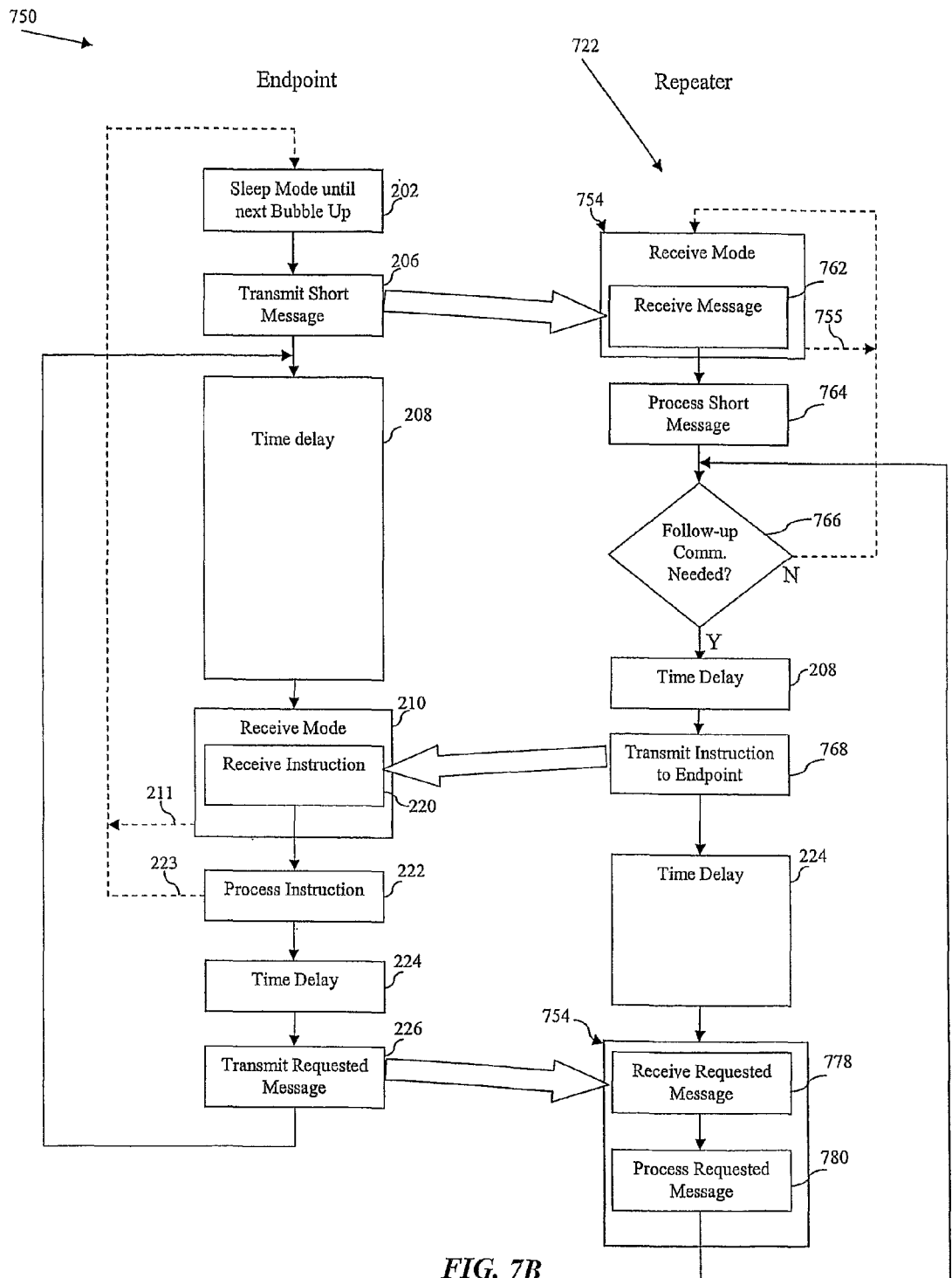

FIGS. 7A and 7B are process flow diagrams illustrating an example operating sequence 700 involving a reader 109, a repeater 122, and an endpoint 108. Referring to FIG. 7A, repeater 122 operates in a low-power sleep mode until the next bubble up event, as indicated at step 702. At step 706, repeater 122 transmits an initial message that includes its unique identification (from which reader 109 can determine that the transmission is from a repeater, rather than from an endpoint). Reader 109 operates at steps 204-205 212, 214, and 216 to receive and process the repeater's initial message, and to determine whether to initiate 2-way communications with repeater 122 as described above with reference to FIG. 2. Repeater 122 and reader 109 observe the time delay of step 708, during which time repeater 122 may operate in its sleep mode. At step 710, repeater 122 enters a receive mode, and at step 718, reader 109 transmits an instruction to repeater 122, which is received at step 720. If it is not received, repeater 122 returns to its default bubble up mode of operation, as indicated at step 711. At step 722, repeater begins carrying out the instruction, after which the repeater may return to its default operating mode, as indicated at step 723. If the instruction included a request for information transmission, repeater 122 observes time delay 724, after which it transmits the requested message at step 726. Reader 109 receives the requested message from repeater 122 at step 728, and processes the same at step 730.

FIG. 7B illustrates an example sequence 750 that follows initiation of instruction processing step 722. Sequence 750 involves operating repeater 122 to communicate with an endpoint 108. In a practical implementation of this example, repeater 122 would likely communicate with a plurality of endpoints 108 in the same manner. At step 754, repeater 122 enters into its receive mode to listen for any endpoint initial message transmissions. Unlike reader 109, which operates its receiver circuit most of the time, repeater 122 may remain in its receive mode for a limited time, as represented at step 755. Endpoint 108 operates substantially as described above with reference to FIG. 2.

At step 762, the initial message from endpoint 108 is received by repeater 122. The message is processed at step 764. This may include comparing the endpoint's ID against the repeater's list of endpoints with which to communicate. Repeater 122 determines if further communication is called for at step 766. Repeater 122 may forward the information contained in the endpoint's initial message and not require additional information from endpoint 108. In other situations, repeater 122 may simply log the endpoint's ID as part of assessing the endpoints in its communication range. As described above, repeater 122 may require further instructions from reader 109 to track this particular endpoint 108. Assuming such communication is needed, repeater observes time delay 208. Unlike reader 109, repeater 122 may sleep during time delay 208. Repeater 122 may also communicate with other endpoints 108 or with one or more readers 109 during this time.

At step 768, repeater 122 transmits an instruction to endpoint 108. The instruction can initiate 2-way communications, configure endpoint 108, or command endpoint 108 to enter a specified operating mode, such as sleep mode, for example. Repeater 122 then observes time delay 224, during which it may sleep or communicate with other endpoints or readers. Repeater 122 enables its receive mode 754 in time to receive, at step 778, the endpoint's requested message transmitted at step 226. At step 780, repeater 122 processes the requested message. In one example embodiment, the processing step 780 includes parsing and placing the information of interest contained in the received requested message from endpoint 108 into a queue or into a composite message for transmission to reader 109.

The performance of the repeater 122 does not have to equal that the main reader 109 in terms of receiver sensitivity and transmit power. Rather, the repeater 122 can be used primarily as a hole filler or AMR system range extender. Repeaters can also be utilized to improve AMR system communication traffic management. For example, repeaters can be assigned to groups of endpoints, and their communication times can be scheduled to utilize the airwaves efficiently and avoid collisions from excessive transmissions.

A significant benefit of the repeater is that it is low cost, easy to place, and provides desirable battery operation. Battery operation permits functionality during power outages, and substantially reduces the cost of installing the repeater. Additionally, battery operation facilitates placement of the repeater in locations where mains or other external sources of power (e.g., sunlight) are unavailable. In one embodiment, a repeater has the same hardware platform as an endpoint. For battery-powered repeaters, additional or larger batteries than those present in typical endpoint devices may be installed to facilitate longer life between service calls.

Interval Data Longing

According to another aspect of the invention, an endpoint stores a large quantity of consumption measurements in its memory. This storage space can store many more intervals than can be transmitted in a typical interval message packet. For example, in one embodiment, the endpoint stores 40 days of hourly consumption data. The intervals associated with this data are can be tracked by a real time clock (RTC) of the endpoint. The RTC can be synchronized periodically by the readers using the two-way communications protocol described above.

Figure 8A:
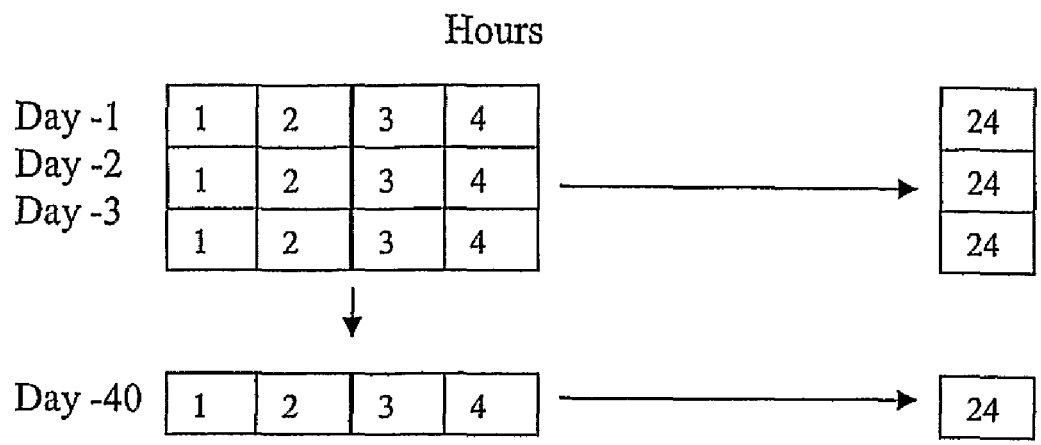
FIGS. 8A and 8B are diagrams illustrating examples of data structures for storing consumption values in endpoints according to one aspect of the invention.
Figure 8B:
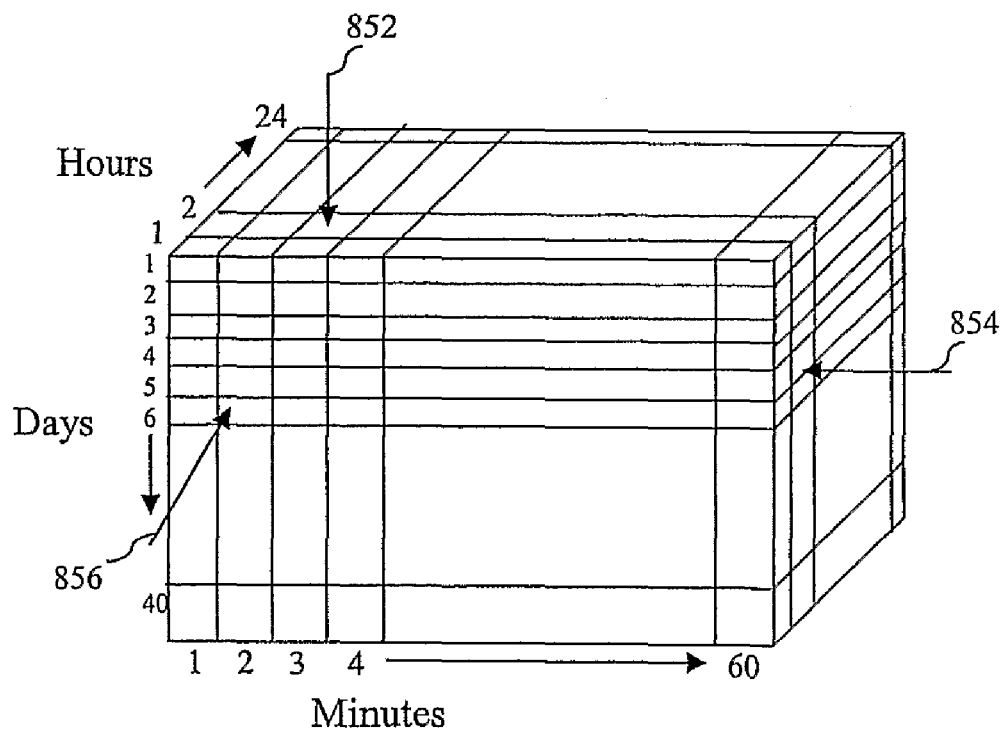

In one embodiment, as depicted in FIG. 8A, the interval data is stored in a data structure that is an array with 40 rows (days) and 24 columns (hours). In another embodiment, as illustrated in FIG. 8B, the array can have three or more dimensions. Referring to the example of FIG. 8B, the array arranges interval reads taken every minute, together with hourly data, and daily data. The column indicated at 852 represents daily reads, taken on the second hour and at the third minute. The column or row indicated at 854 contains minute-by-minute reads taken on day 5, hour 2. The column or row indicated at 856 contains hourly reads on day 2, taken at minute 2.

More generally, this aspect of the invention structures the consumption data in tiers of time granularity. At the finest granularity, every item of meter data is present. For example, if consumption readings are obtained every 10 seconds instead of hourly, the finest level of granularity would be 10 seconds. At the next tier of time granularity, only one or more subsets of the full set of meter data is included. For example, if readings are taken every minute, and if the utility provider wishes to obtain hourly reads and weekly reads, then hours and weeks can be included as separate dimensions in the data structure.

Each cell in the array can contain the total (absolute) consumption measured when the value was stored in that cell, or can contain a delta value relative to an adjacent cell or to a reference value.

When the endpoint is operating, it will sequence through each cell of the finest time granularity, then the next finest, and so on, filling in the consumption or delta value in the corresponding cell. This process continues to the last row of the array. When the array is full, the cells can be populated starting at the opposite coordinate (i.e., it will wrap around and start over)

Since the endpoint has knowledge of time, it can be configured to always sample its finest granularity interval data at the same instant. For example, in the case of hourly reads, the endpoint can store the interval information as it existed at the top of each hour.

Referring to the example of FIG. 8A, when a reader requests a set of daily reads, such as for move-in/move-out, the endpoint will return the most recently completed column from the array. This will return an array holding the consumption values for the last interval and 39 deltas for the previous days.

A dump of the entire interval array is possible as a series of commands under FCC Part 15.249 rules. To conduct a "Dump All" a programmer is utilized, and the programmer will accomplish this task at 0 dBm on the programming frequency. The programmer can perform a series of 24 Interval requests to get the 24 sets of hourly interval readings that constitutes a dump of all intervals.

By structuring the collected data at the endpoint in this manner, requests by the reader or repeater for certain intervals to be returned by the endpoint can be communicated simply. For example, a request for interval data can specify which row or column (or plane, etc.) is desired. Additionally, in situations where large amounts of interval data are being transferred, and an error is detected, a follow-up communication by a reader can request specific intervals that were lost in the failed portion of the earlier communication without having to re-transmit the entire set of interval data.

In a related embodiment, a reader can utilize two-way communications to re-configure the time granularity definitions in the endpoint. In another related embodiment, an endpoint may be configured to transmit interval data at a different data rate. For example, in a mobile system where a reader is in communications range with each endpoint for a limited amount of time, the data rate for larger interval data messages may be set to a higher value to enable more data to be communicated during the available window.

Example Implementation

The following describes a specific implementation of the RF Based Meter Reading System described in the paragraphs immediately above. In this embodiment, communication occurs in the 900 MHz ISM band. It could however be implemented at different frequencies without departing from the spirit or scope of the invention. On off keying (OOK) and frequency shift keying (FSK) modulation are utilized.

Initially, an endpoint, such as endpoint 108 (FIG. 1) bubbles up to transmit a SCM. Immediately after transmitting an SCM the endpoint 108 goes into receive mode. The SCM that is transmitted is sent using OOK or FSK. OOK can be used for backwards compatibility with existing readers, and for power savings (since approximately ½ of the bits require zero energy to transmit). FSK can provide improved performance.

When the endpoint 108 goes into receive mode it utilizes an FSK receiver. The SCM is modified by appending the channel that the receiver will listen on. In addition, other information may be appended such as tamper flags requesting an immediate call back from the reader 109. When the reader 109 receives the SCM, if it requires more information from the endpoint 108, it will carry on a two-way FM session with the module. The SCM will bubble up from the endpoint 108 on fixed intervals. It will also be transmitting at 1 mW (i.e., 0 dBm) to be compatible with the existing endpoints 108 already deployed and operating under FCC 15.249 rules. Since the SCM synchronizes the endpoint 108 to the reader 109, any two-way FM transmissions that follow can utilize higher power transmissions and operate under FCC 15.247 rules. If the SCM is transmitted at a controlled frequency, with little drift, then the receiver trying to read it can be a narrow band receiver. By using a narrow band receiver, the receiver sensitivity can by increased by over 5 dB, over existing reading devices that employ wideband receivers of around 250 kHz. These endpoints would be backward compatible into existing ERT-based AMR systems.

In one embodiment, advanced readers 109 employ a DSP radio enabling the receive bandwidth to be set by DSP firmware. This arrangement enables reading previously-existing legacy endpoints 108 with reduced sensitivity. The system at this level can be used primarily by a mobile meter reading system that utilizes readers such as handheld readers and vehicle-mounted readers. The bubble rate is set to maximize battery life and to provide the desired level of system performance. Since it is a two-way system, the reader 109 is able to tell the endpoint 108 to bubble at a much slower rate until the next read time. This saves battery life but still leaves the endpoint 108 available for reads.

As the deployment is migrated from a mobile meter reading system to a fixed network meter reading system, the endpoints 108 can be programmed to transmit the data at a much slower rate. In an example of a fixed network situation, only the ID is transmitted to reduce transmission time. If the data rate is reduced to 1200 baud about 10 dB of gain can be realized. Since the transmission time will be longer, the bubble rate can be reduced to maintain battery life. A system running in this mode is able to use fewer readers that are placed in the field. The two-way FM link can still be used; however, higher transmission power may be needed to match the AM performance in either mode (fast or slow data rate). If a channelized receiver is used it is possible to transmit the SCM at a higher power, e.g., +10 dBm, and comply with FCC 15.247 rules on the AM bubble up.

Further development of this system includes having the endpoint 108 operate under 15.247 rules FM two-way all the time. This system would be most appropriate for electrical meters that are line-powered. The electrical meters can transmit as often as they want and leave their receivers on to keep synchronization with a fixed network radio.

In order to get better coverage over a deployed metering system, a repeater 122 can be implemented. This repeater 122 is used mainly as a hole filler. The repeater 122 is not intended to have the same receiver sensitivity and, as a result, it can use lower cost and lower power components. It is possible to have the repeater 122 run off of lithium batteries at relatively low cost. The repeater 122 can bubble up just like an endpoint. Once it is acquired by the reader 109, it is told to go into a listen mode to find all of the endpoints 108 in its area. The repeater 122 then transmits the IDs of the endpoints 108 within its communication to the reader. The reader 109 compares the list to the endpoints 108 that the reader 109 can communicate with. The reader 109 then instructs the repeater 122 to listen only to the endpoints 108 that the reader 109 cannot communicate with reliably. The repeater 122 tracks the endpoints 108 by turning on its receiver at the time the endpoint 108 is due to bubble up.

In the case of monthly reads, the repeater 122 can stay asleep for most of the month and then turn on and acquire its endpoints 108 near the reading time. In general, if the reader 109 wants a reading from an endpoint 108 under a repeater 122, the reader 109 tells the repeater 122 on the two-way FM link. This happens after the repeater 122 bubbles up its ID. The repeater 122 then waits for the endpoint 108 to bubble up and either uses the SCM data or requests additional data. Once the data is obtained the repeater 122 sends it up to the reader 109. It may be sent as soon as it is acquired or it may synchronize with the next bubble up. To minimize the number of channels the repeater 122 or reader 109 look for the endpoint 108 on, a select number of channels can be used for bubbling up. These channels can be distributed across the ISM band. This arrangement works under the FCC §15.249 rules.

Quantitative Improvement

The quantitative improvement provided by the specific implementation described above can be better understood when described in contrast to the Itron meter reading technology of today. The Itron meter reading technology of today operates under FCC 15.249 rules. The endpoint 108 transmits at 1 mW (i.e., 0 dBm) output power and its receiver has a sensitivity of around −90 dBm. This receiver operates in the MAS band, which requires an FCC license. The readers 109 for this system generally fall into two categories: (1) A mobile reader such as a van that has a receiver sensitivity of −113 dBm and a wake-up transmitter output power of around +38 dBm; and (2) Other Readers, e.g., handhelds and fixed networks, having a receiver sensitivity of around −108 dBM and a wake-up transmitter power of +23 dBm and +30 dBm, respectively. The RF link in today's encoder/receiver/transmitter (ERT) system is:

| Van to ERT = 123 dB | Reader to ERT = 108 dB |
|---|---|
| ERT to Van = 113 | ERT to Reader = 108 dB |

Aspects of the present invention, at a first level, address a mobile meter reading system. Specifically, this aspect provides backward compatibility and provides for future migration. Embodiments of the present invention operate to limit the amount of frequency drift from the endpoint 108 so that a receiver with a narrower bandwidth can be used. Using a frequency locked RF chip such as the Bluechip BCC918 and configuring it to transmit OOK at low power provides a frequency stable endpoint. This then enables the use of a narrowband receiver and increases receiver sensitivity. If the bandwidth is reduced from 256 kHz to 50 kHz then around a 7 dB sensitivity improvement can be realized. The frequency stable endpoint 108 can bubble up an SCM transmission, thereby removing the need for a wake-up transmitter. This transmission can have, for example, an output of 0 dBm that is compliant with FCC §15.249 rules just like the Itron ERT of today. If the endpoint 108 is deployed in an existing system, an existing reader 109 can read it with the same performance as the existing system. If it is in a new deployment then a new reader can read it with a 7 dB improvement in the link. The new reader 109 can read existing ERTs as well. If a DSP channelized receiver is employed then the receiver can decode on a narrow channel for new endpoints 108 or it can average channels together to get the required bandwidth to read old endpoints 108. When reading old endpoints 108 the system performance is that of an old system, i.e., 7 dB less link than a new one. The RF link in the system of according to this embodiment (for mobile systems) is:

ERT to reader=116 dBM (based on new CCU4 receiver sensitivity of −109 dBm)

The SCM that is transmitted can include information appended to the end of the message. This does not interfere with the ability of an old reader to decode the message and it does provide additional information for the mobile meter reading system. Additional information can include a channel number for the reader 109 to call back on as well as priority flags that may indicate a power failure, for instance, requiring an immediate callback from the reader 109. After the endpoint 108 sends the SCM packet, it either listens on the same channel on which it transmitted the SCM, or notifies the reader of the channel number on which that it will be listening as part of the SCM packet, for example. The endpoint 108 then goes into receive mode and listens on that channel for a short period of time, e.g., 5 to 10 milliseconds. The receipt of the SCM synchronizes the reader 109 to the endpoint 108 (in time and in frequency) so the reader 109 knows when and where to locate the endpoint 108. If the reader 109 requires more information such as ID or response to a power fail it can initiate two-way communications on the channel that the endpoint 108 will be listening on as described above.

The two-way communications between the reader and the endpoint are frequency modulated (e.g., FSK) and at a higher power. Since both ends are synchronized the two-way communications can take place under the FCC 15.247 rules. Using the example of a bluechip RF part, the endpoint 108 has a receiver sensitivity of −105 dBm at 9600 baud (19.2 k Manchester encoded). The receiver's transmit power is +10 dBm. If the reader 109 has a transmit power of +10 dBm and a receiver sensitivity of −105 dBm then it would match the performance of the AM SCM link. The RF FM two-way link in the system of this embodiment (for mobile systems) is:

ERT to reader=115 dB
Reader to ERT=115 dB

One example of a SCM message format is as depicted below:

| Preamble | ID and Data | CRC (optional) | Next Channel (optional) |
| --- | --- | --- | --- |

At a second level, embodiments of the present invention are applicable to fixed meter reading networks. When the AMR system is sufficiently saturated with endpoints that the utility provider wants to move to a fixed network solution, the endpoints already deployed in the mobile system can be reconfigured to operate in a somewhat different regime. In one example, the system remains a bubble up system but it bubbles up at a slower rate. The data rate is also reduced to 1200 or 2400 baud. In this mode, the endpoint 108 can bubble up only its ID to reduce transmit time. Alternatively, the endpoint can transmit an SCM or SCM-like packet.

At the slower data rate, a processing gain of about 10 dB can be realized at the receiver. This gives the receiver an effective sensitivity of about −126 dBm. A slower data rate can be used for the two-way exchange as well, improving the receiver sensitivity. Since this is a fixed network, the endpoints are always in range of the reader, so there is no time window in which communication must be completed. By utilizing a quality low noise amplifier (LNA) that is commercially available in the reader's receiver, and cutting the data rate in half, a 5 dB gain in reader sensitivity on the FM link can be obtained. This provides a sensitivity of −110 dBm in the FM receiver.

The endpoint receiver gains around 3 dB in sensitivity from a slower data rate. The reader 109 can transmit at 18 dBm on the FM link. If a Bluechip ASIC is used, a power amplifier can be included to increase its output from 10 dBm to 16 dBm. This gives a balanced link for both the AM bubble up and the FM two-way links. The fixed network RF links of the present invention are as follows:

AM Endpoint to reader=126 dB
FM endpoint to reader=126 dB
FM reader to endpoint=126 dB Repeaters The issue of holes in the reading area of a fixed network is of real concern. As such, a repeater 122 can be used to relay information from an endpoint 108 to the reader 109. The repeater 122 does not have the same performance as the main reader 109 because it is mounted closer to the endpoint 108 and is much lower in cost than the reader 109. Further, the repeater 122 can be battery-powered so that connecting to the mains is not a concern. The repeater 122 can use an RSSI type decoder for decoding AM signals from an endpoint 108 and has a sensitivity of −106 dBm. In one embodiment, the repeater 122 bubbles up its ID just like an endpoint.

When a reader 109 acquires the repeater 122, the reader 109 instructs the repeater to enter a listen mode to find all of the endpoints 108 within communication range. This leaves the repeater 122 receiver on for many tens of seconds while it locates the IDs of endpoints 108 bubbling up in its vicinity. The repeater 122 then sends this information up to the reader 109. The reader 109 will determine which of the endpoints 108 it cannot communicate with and instruct the repeater 122 to listen to only those endpoints. In an alternative embodiment, this selection may happen further up the chain at the head end to arbitrate between system cells and determine which repeater 122 will be assigned which endpoint. When it is time to read the endpoints 108, the reader instructs the repeater 122 to get a reading when the repeater 122 bubbles up its ID. The repeater 122 then collects the reading from the endpoints 108 and passes them up to the reader 109. This may cause latency in the system.

One example technique to reduce this latency is for the reader 109 to transmit a reading schedule to repeater 122. This enables repeater 122 to perform the reading of its assigned endpoints 108 automatically. Repeater can send its collected endpoint data to the reader 109 during the next bubble up period. To conserve power, the repeater 122 synchronizes its receiver time to the anticipated transmit time of endpoints 108 in its domain; the repeater 122 sleeps 2Q between reads. For the endpoints 108 and the repeaters 122, if the reading schedule is regular, e.g., daily reads, then the endpoints 108 are instructed to bubble up at a slower rate for 23 out of 24 hours. The endpoints 108 and repeaters 109 then increase their bubble rate as the read time gets near. Once the reading is obtained the endpoints 108 and repeater 122 bubble slowly again. While bubbling up at a slower rate permits unscheduled reads to take place, it may take longer to get them.

Battery Life

The following description provides an analysis of estimated battery life that may be attainable in endpoints operating according to aspects of the invention. In this embodiment, an endpoint uses a 3.6 V lithium ion A cell battery having a capacity of approximately 3.3 A-H.

The average current from the battery during transmission is about 96.5 mA in 24 dBm mode, or about 22 mA in 10 dBm mode. The duration of the SCM transmission is 5.86 ms. This would give 347.4 mW in 24 dBm mode and 79.2 mW in 10 dBm mode. Multiplying these values by 5.86 ms produces 2 mW-seconds for 24 dBm and 464.1 uW-seconds in 10 dBm.

The processor draws slightly less than 2 micro amps when the endpoint is in its sleep state. The receiver circuit draws about 15.2 mA for 2 ms during the listening time windows, or 109.6 uW-seconds.

All of these values averaged over the bubble up period work out to an average current draw of about 14 uA, which can be sustained for 20 years on the A cell. This estimate includes taking into account empirically observed non-linearities in the battery drain based on load conditions.

IDM messages, or requested messages having longer packets can have variable length. A typical IDM response is expected to be about 120 bits at 16384 bits/sec, or 7.3 mS. In this embodiment, IDM messages are sent at about 24 dBm, or 347.4 mW. IDM transmissions occur only when asked, which is generally on the order of once per month, so they represent a negligible impact to the overall battery life. when endpoints are operated as such.

Extending Transmission Duration

Conventionally, the transmitter circuit includes a power regulator that must receive a supply voltage in excess of a certain threshold. One challenge with long transmissions is their high power draw can load the supply, causing a dip in supply voltage, thereby shutting down the power regulator. While conventional approaches to mitigate this effect, such as placing capacitors across the power supply, are well known, these approaches provide only limited advantage due to size and cost constraints associated with using large capacitors.

Figure 9:
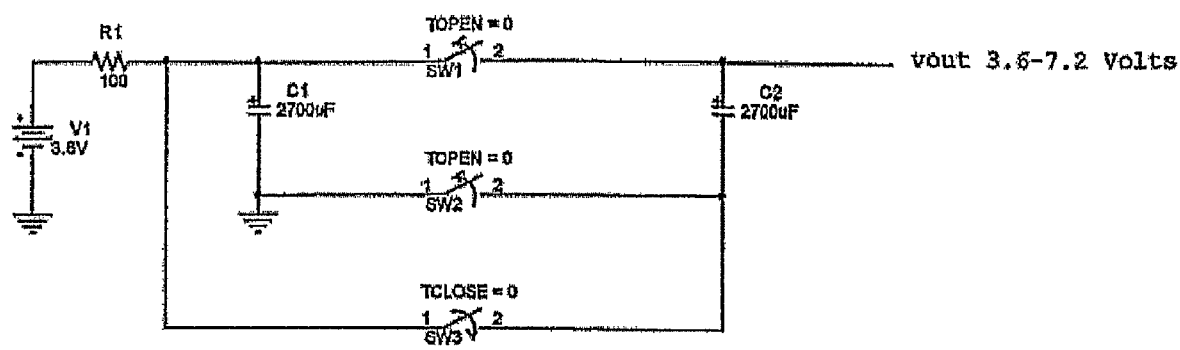
FIG. 9 is a circuit diagram illustrating an example embodiment of a switched capacitor arrangement for temporarily boosting the available power for powering the transmitter circuit during data transmissions.

FIG. 9 is a circuit diagram illustrating an example embodiment of a switched capacitor arrangement for temporarily boosting the available power for powering the transmitter circuit during data transmissions. This voltage boost permits the power regulator to operate above its threshold voltage for a longer time, thereby enabling longer transmissions. In normal low power mode switches SW1 and SW2 are closed and SW3 is open. These switches may be implemented with transistors, transmission gates, relays, or the like. In this configuration the output voltage is 3.6 volts. With the capacitors C1 and C2 connected in a parallel configuration the current drawn from the module is shared by both capacitors. The parallel bulk capacitance is sufficient for operating an endpoint and producing short high powered transmissions. When a high voltage level is required, such as for transmitting longer high powered data messages, switches SW1 and SW2 open and SW3 closes. This provides 7.2 volts at the output. This higher voltage can be used to provide improved overhead for the transmitter. Advantageously, because the capacitors are already charged there is no charging latency to produce the higher voltage virtually immediately. When the high power mode is no longer needed the capacitors are switched back to a parallel configuration. The capacitors are then recharged in parallel. There is latency in recharging the capacitors but it is much smaller than the bubble up times required by the AMR.

Resistor R1 is shown to represent the series resistance of the battery. Additionally, R1 could be used to limit the charge current of the capacitors, minimizing the current drain and therefore voltage sag on the battery. Capacitors C1 and C2 are sized so that when they are connected in series they provide enough capacitance for the high powered message transmission.

Low Cost Mobile Daily Interval Meter Reading System

The mobile daily interval reading system according to embodiments of the present invention utilizes the concepts described above but further expands on the earlier discussion by applying additional techniques for collecting daily interval data.

The mobile daily interval reading system works as described herein below. If an endpoint 108 is deigned to transmit at a higher power, e.g., +10 dBm, and the receiver has a sensitivity of −114 dBm, a one-mile range can be achieved in a mobile environment. If the endpoint 108 is a bubble-up endpoint 108 that transmits every ten seconds and the reader 109 travels at 30 miles per hour the reader 109 is in range for approximately 100 seconds. The endpoint 108 can be configured to transmit either in AM or FM and send an initial message such as the Standard Consumption Message (SCM) that the Itron ERTs send today. It can also have an FM receiver with a sensitivity of around −109 dBm for low data rate messages. After the endpoint 108 transmits its consumption data it listens on the same channel it transmitted on. If this is used in an electric meter the endpoint 108 can leave its receiver on as long as it is not transmitting.

As described above, this system can be modified to improve field service life in battery-powered products. When the reader 109 receives a message from the endpoint 108 it can take a measurement of the signal strength (RSSI) and determine if the endpoint 108 is in range or the channel is clear enough for subsequent transmissions. If the RSSI value is below a threshold, or if the channel is not clear the reader 109 does not reply and the endpoint 108 retransmits its SCM ten seconds later on another channel as part of its normal bubble-up operation.

When the RSSI is strong enough and the channel appears to be clear, the reader 109 transmits a command to the endpoint 108 to send some number of intervals and on what channel or channels. The reader 109 transmits this request at +10 dBm, or could go to +20 dBM if needed. This complies with the 15.247 rules because the endpoint receiver would be tracking the transmitter of the reader 109. Actually, the transmitter of the reader 109 is tracking the endpoint receiver since the reply is on the same channel that the endpoint transmitted on. It is possible for the endpoint to skip a pre-defined number of channels up or down from its last transmission just to keep the band randomized, but this is not required.

The endpoint 108 can send data to the reader 109 at a higher data rate than the SCM transmission, e.g., 20k bits per second. If the endpoint 108 is in an electric meter it can save 15 minute interval data in 2 bytes (16 bits) of memory. There are 96, 15 minute intervals in a 24 hour period. If the endpoint 108 transmits 35 days worth of intervals, that amounts to 3360 intervals, or 53,7690 bits. Allowing for some overhead, that number can be rounded to 60,000 bits. At 20,000 bits per seconds (BPS) the endpoint 108 can transmit 35 days of 15 minute interval data in 3 seconds. If the data rate is increased to 32,768 BPS the transmission time is 1.83 seconds for 35 days worth of data. A data rate of 32,768 BPS should cost about 3 dB in receiver sensitivity. However, with 110 seconds in range and only 1.83 seconds to send the data there is some sensitivity, and therefore range, to give up. The FCC rules for 15.247 specify that at the higher power a transmission can only last 0.4 seconds in a 10 second period on any one channel. The endpoint 108 can hop between channels to send all of the data. To send 35 days worth of data the endpoint 108 would hop over 5 to 6 channels depending on packet overhead. If a transmission is lost due to a hop to a noisy channel the endpoint 108 can be instructed to resend only that block on another channel.

Once all of the data is transmitted the endpoint 108 is instructed to reset any registers that need to be reset and then told to go to sleep for a specified period of time, e.g., 10 minutes, to keep the band clear of unneeded bubble-up transmissions. A system such as this can utilize a limited number of commands to the endpoint 108 to keep the system simple. The commands can include:

Send X number of past intervals
Send block X on channel X
Reset registers, the endpoint may reply with an ACK
Send time of use (TOU) data
Sleep for X time Additional commands may be added without departing from the spirit or scope of the invention.

This system approach is possible because of the more than 16 MHz of bandwidth available in the ISM band. A alternative of the present system is to have the reader 109 tabulate all of the endpoints 108 that bubble in a 5 second interval. The endpoints 108 would leave their receivers on long enough to wait for the response. The reader 109 would then request data, from all of the endpoints 108 with which it communicated, on frequencies spread through the ISM band. This approach is desirable because when the reader is transmitting it cannot receive. Using a DSP based multichannel receiver multiple transmissions can be received simultaneously. Not only can interval packets be received but the multichannel receiver can continue to listen for new candidates bubbling up. It can also read and decode legacy ERTs during this time By collecting 15 minute interval data for 35 days, a utility is allowed not only to do monthly reads but to obtain profiling data for distribution optimization as well. Move in, move out could be billed to the nearest 15 minute interval. The reading performance of this system is similar to, or better than, that of the mobile collector. It allows basic SCM type reads or higher functionality reads from the same installed base. If the reader does not want the additional data it does not request it.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed:

1. An automatic meter reading (AMR) system, comprising:
   a reader;
   a plurality of endpoints, wherein each of the plurality of endpoints is adapted to conduct radio frequency (RF) communication with the reader; wherein each of the plurality of endpoints initiates a communication session with the reader as part of a bubble-up operating mode by transmitting a one-way communication; and
   wherein the reader selectively initiates two-way communication with individual ones of the plurality of endpoints in response to receipt of a one-way communication from each of those endpoints, and wherein the reader adjusts a bubble-up operation parameter in a first endpoint via the two-way communication.

2. The AMR system of claim 1, wherein the reader schedules a period of increased bubble-up activity of the first endpoint during the two-way communication with that endpoint.

3. The AMR system of claim 1, wherein the reader instructs the first endpoint during the two-way communication sequence to enter a sleep mode for a specified time duration.

4. An automatic meter reading (AMR) system, comprising:
   a reader; and
   a plurality of endpoints, wherein each of the plurality of endpoints is adapted to conduct radio frequency (RF) communication with the reader;
   wherein each of the plurality of endpoints initiates a communication session with the reader as part of a bubble-up operating mode by transmitting a one-way communication; and
   wherein each of the plurality of endpoints is remotely configurable, via the AMR system, to schedule a time window during which that endpoint operates at a special bubble-up rate that is different from a default bubble-up rate of the endpoint.

5. In an automatic meter reading (AMR) system comprising a reader and a plurality of endpoints, each of the endpoints adapted to conduct radio frequency (RF) communication with the reader on a bubble-up basis, a method of migrating from a primarily mobile network to a fixed network AMR system, the method comprising:
   initiating two-way communication between the reader a first endpoint; and
   during the two-way communication, instructing the first endpoint to slow a default bubble-up rate.

6. The method of claim 5, further comprising:
   during the two-way communication, instructing the first endpoint to increase transmission power level.

7. The method of claim 5, further comprising:
   during the two-way communication, instructing the first endpoint to respond to a specified reading time by temporarily increasing a bubble-up rate.

8. In an automatic meter reading (AMR) system comprising a reader and a plurality of endpoints, each of the endpoints adapted to conduct radio frequency (RF) communication with the reader on a bubble-up basis, a method of improving communication reliability, the method comprising:
   receiving, by the reader, a first message transmitted by a first endpoint at a first frequency;
   determining, by the reader, whether the first frequency is suitably centered within a predefined communication channel associated with the first message;
   initiating two-way communication between the reader the first endpoint;
   during the two-way communication, sending an instruction to the endpoint from the reader, wherein the instruction specifies a frequency correction for the endpoint to implement.

9. An automatic meter reading (AMR) system, comprising:
   a reader; and
   a plurality of endpoints, wherein each of the plurality of endpoints is adapted to conduct radio frequency (RF) communication with the reader on a bubble-up basis;
   wherein the reader receives a first message transmitted by a first endpoint at a first frequency;
   wherein the reader determines whether the first frequency is suitably centered within a predefined communication channel associated with the first message;
   wherein two-way communication is initiated between the reader the first endpoint; and
   wherein during the two-way communication, the reader sends an instruction to the endpoint specifying a frequency correction for the endpoint to implement.

10. An automatic meter reading (AMR) system, comprising:

a reader; and a plurality of endpoints, wherein each of the plurality of endpoints is adapted to initiate radio frequency (RF) communication session with the reader on a bubble-up basis in a one-way mode, and to respond to a reader-initiated continuation of the communication session in two-way mode;

wherein the reader is configured to measure a received signal strength indication (RSSI) of a first message received from a first endpoint of the plurality of endpoints; and wherein the AMR system is configured to respond to the measured RSSI by modifying future interaction with the first endpoint.

11. The AMR system of claim 10, wherein the reader is configured to determine whether or not to initiate continuation of the communication session based on the measured RSSI.

12. The AMR system of claim 10, wherein the first message is received by the reader in either the one-way mode or in the two-way mode.

13. The AMR system of claim 10, wherein the reader is configured to issue an instruction to the first endpoint requesting certain data to be transmitted in the two-way mode; and
wherein the reader determines what data to request in the instruction based on the measured RSSI.

14. The AMR system of claim 10, wherein the reader is configured to issue an instruction based on the measured RSSI for reception by the first endpoint in the two-way mode, the instruction instructing the endpoint to change channels on which to transmit.

15. The AMR system of claim 10, wherein the reader is configured to communicate information to an AMR system controller based on the measured RSSI and wherein the system controller is adapted to modify a mobile collection route or schedule based on that information.

16. The AMR system of claim 10, wherein the reader is configured to communicate information to an AMR system controller based on the measured RSSI and wherein the system controller is adapted to reassign the first endpoint to a different reader.

17. The AMR system of claim 10, wherein the first endpoint is instructed to increase transmission power level in response to the measured RSSI.

18. The AMR system of claim 10, wherein: RSSI values associated with certain communications are logged; and the logged RSSI values are analyzed to identify a potential trend or characteristic of a communication arrangement between the first reader and the first endpoint.

19. In an automatic meter reading (AMR) system comprising at least one reader and a plurality of endpoints, each of the endpoints adapted to conduct radio frequency (RF) communication with one of the at least one reader on a bubble-up basis in a one-way mode, and in a selectively-initiated two-way mode that is initiated by an AMR system device other than that endpoint, a method of assessing or predicting communication reliability, the method comprising:
measuring channel clarity; and
making a decision by the reader affecting future communication with at least one endpoint based on the measured channel clarity.

20. An automatic meter reading (AMR) system, comprising:
a reader;
a repeater; and
a plurality of endpoints;

wherein each of the plurality of endpoints is capable of conducting radio frequency (RF) communication with the reader and with the repeater;

wherein the repeater is adapted to conduct RF communication with selected ones of the plurality of endpoints and with the reader;

wherein each of the plurality of endpoints initiates a communication session with the reader or the repeater via an initial one-way communication;

wherein the reader and the repeater selectively initiate two-way communication with individual ones of the plurality of endpoints in response to receipt of an initial one-way communication from each of those endpoints;

wherein the repeater initiates a communication session with the reader via an initial one-way repeater message; and wherein the reader selectively initiates two-way communication with the repeater in response to receipt of the repeater message.

21. The AMR system of claim 20, wherein the repeater is battery-powered.

22. The AMR system of claim 20, wherein the reader and the repeater each automatically synchronizes communication activity in time with communication activity of each of the individual ones of the plurality of endpoints with which the reader or repeater selectively communicates in two-way mode.

23. The AMR system of claim 22, wherein the reader and the repeater each automatically synchronizes communication activity in channel hopping to match a channel hopping sequence of the communication activity of each of the individual ones of the plurality of endpoints with which the reader or repeater selectively communicates in two-way mode.

24. The AMR system of claim 20, wherein the reader operates in a sleep mode for a majority of the time.

25. The AMR system of claim 20, wherein the initial one-way communication of each endpoint and of the repeater includes a radio packet comprising essentially an identification of that endpoint or repeater.

26. The AMR system of claim 20, wherein the initial one-way communication of each endpoint or reader includes an indication of a next subsequent channel on which that endpoint or repeater will be listening.

27. The AMR system of claim 20, wherein each endpoint is configured to normally operate in a receive mode during a time window that begins sometime after each message transmission receivable by the reader or the repeater; and wherein the repeater is configured to selectively transmit an instruction to each endpoint in response to receiving a message transmission from that endpoint, wherein the instruction is transmitted such that it can be received during a corresponding time window.

28. The AMR system of claim 27, wherein the reader responds to the repeater's initial one-way repeater message by transmitting an instruction receivable by the repeater, wherein the instruction requests that the repeater transmit a list of endpoints within communication range.

29. The AMR system of claim 27, wherein the reader responds to the repeater's initial one-way repeater message by transmitting an instruction receivable by the repeater, wherein the instruction specifies the endpoints with which the repeater should engage in two-way communication.

30. In an automatic meter reading (AMR) system, a method of gathering consumption information by an endpoint for facilitating collection of different sets of interval data, the method comprising:
obtaining consumption data at a first time granularity; and storing each obtained item of consumption data in a data structure having multiple tiers of time granularity.

31. The method of claim 30, wherein storing each obtained item of consumption data includes storing the data in a multidimensional table or array, wherein each dimension corresponds to a different time granularity.

32. The method of claim 31, wherein storing each obtained item m a multidimensional table or array, includes storing consumption values in a days×hours matrix.

33. The method of claim 30, further comprising transmitting an interval data request to the endpoint by a reader in the AMR system, wherein the request specifies coordinates of the data structure under which the desired consumption data is stored.

34. The method of claim 30, wherein storing each obtained item of consumption data includes storing either absolute consumption values, or delta values.

35. An automatic meter reading (AMR) system endpoint, comprising: a processor operatively coupled to a data store, the processor programmed to store a data structure in the data store that has multiple tiers of time granularity, wherein items of consumption data are stored in locations within the data structure corresponding to the time that each item of consumption data was gathered.

36. The endpoint of claim 35, wherein the data structure is a multidimensional array.

37. The endpoint of claim 35, wherein the data structure is a days×hours matrix.

38. A power conditioning circuit portion of an endpoint, comprising:
  a battery;
  a voltage regulator;
  a set of capacitors; and
  a switching network; wherein the switching network can arrange the set of capacitors a parallel fashion to charge from an endpoint power source; and
  wherein the switching network can selectively arrange the set of capacitors in a series fashion to boost a supply voltage to the voltage regulator.

39. An endpoint for use in an automatic meter reading (AMR) system that includes a reader adapted to conduct radio frequency (RF) communication with a plurality of endpoints that includes the endpoint, the endpoint comprising:
  a radio transceiver and a controller that is configured to cause the endpoint to:
    operate in a low-power of mode for a majority of the time, wherein the radio transceiver is inactive;
    momentarily exit the low-power mode and operate the radio transceiver to transmit an initial message that includes an identification of the endpoint and consumption information pertaining to that endpoint; and
    following a predetermined time delay of at least zero seconds after the initial message is transmitted, momentarily operate the radio transceiver in a receive mode to await any further instruction from the reader.

40. The endpoint of claim 39, wherein the initial message comprises a standard consumption message (SCM).

41. The endpoint of claim 39, wherein the controller causes the endpoint to:
  in an absence of any of said further instruction from the reader during the receive mode, return to the low-power mode; and
  in response to receiving a further instruction during the receive mode and instructs the endpoint to transmit a requested message:
    operate the radio transceiver to transmit a requested message following a predetermined time delay of at least zero seconds after receiving a further instruction; and
    operate the radio transceiver to enter into the receive mode to await any further instruction from the reader following a predetermined time delay of at least zero seconds.

42. The endpoint of claim 39, wherein the radio transceiver transmits the initial message using on-off keying (OOK) modulation.

43. The endpoint of claim 39, wherein the radio transceiver operates in a frequency shift keying (FSK) receive mode.

44. The endpoint of claim 39, wherein the controller adjusts an operating perimeter or configuration settings in response to the endpoint receiving the instruction.

45. In an automatic meter reading (AMR) system that includes a reader and a plurality of endpoints adapted to conduct radio frequency (RF) communication with the reader, a method of conducting communication between one of the endpoints and the reader, the method comprising:
  operating the endpoint to enter into a receive mode and into a transmit mode based on a time schedule followed by the endpoint, wherein the communication session between a reader and the endpoint is initiated by operation of the endpoint in the transmit mode;
  deciding, by the reader, whether or not to continue the communication session; and
  in response to a decision by the reader to continue the communication session, transmitting an instruction to the endpoint by the reader such that transmission of the instruction is synchronized to the time schedule followed by the endpoint to coincide with operation of the endpoint in the receive mode.

46. The method of claim 45, wherein transmitting the instruction to the endpoint by the reader includes transmitting at least one instruction selected from the group consisting of: a sleep command, a command requesting a message from the endpoint, and a command to adjust an operating characteristic of the endpoint, or a command achieving any combination thereof.

47. The method of claim 46, wherein the command to adjust an operating characteristic of the endpoint includes an identification of a transmission channel for a time slot in which the endpoint is to conduct communication activity.

48. The method of claim 45, further comprising:
  receiving the instruction by the endpoint;
  processing the instruction by the endpoint; and
  In response to the processing, activating the receive mode of the endpoint for a predetermined duration of time.

49. In an automatic meter reading (AMR) system that includes a reader and a plurality of endpoints adapted to conduct radio frequency (RF) communication with the reader, a method of conducting communication between one of the endpoints and the reader, the method comprising:
  initiating a communication session by the endpoint, including transmitting an initial message as part of a bubble-up event;
  receiving the initial message by the reader; and
  initiating two-way communication by the reader in response to the initial message, the two-way communication being part of the communication session initiated by the endpoint; and
  controlling a further course of the two-way communication by the reader.

50. The method of claim 49, further comprising:
concluding the communication session by the reader, including either foregoing instructing the endpoint to transmit a subsequent message, or instructing the endpoint to operate in a sleep mode.

51. The method of claim 49, further comprising:
operating the reader to instruct the endpoint to transmit a requested message as part of the two-way communication.

52. The method of claim 49, further comprising operating the endpoint in a receive mode in response to a recurrence of at least one condition selected from the group consisting of: initiation of the communication session, initiation of the two-way communication, receipt of an instruction from the reader wherein the instruction does not instruct the endpoint to enter a low-power sleep state, or any combination thereof.

53. An automatic reader for use in an automatic meter reading (AMR) system that includes a plurality of endpoints, each being adapted to initiate a radio communication session with the reader by transmitting an initial message, the automatic reader comprising:
a radio receiver circuit that receives the initial message from the first endpoint; and
a radio transmitter circuit that initiates two-way communication in response to the initial message,
wherein the two-way communication is part of the communication session initiated by the first endpoint and wherein the automatic reader controls a further course of the communication session.

54. The automatic reader of claim 53, wherein the reader concludes the communication session by either for going instructing the first endpoint to transmit a subsequent message, or by instructing the first endpoint to operate in a sleep mode.

55. The automatic reader of claim 53, wherein the reader instructs the endpoint to transmit a requested message as part of the two-way communication.

56. The automatic reader of claim 53, wherein the endpoint operates in a receive mode and response to one occurrence of the condition selected from the group consisting of: initiation of the communication session, initiation of the two-way communication, receipt of an instruction from the reader wherein the instruction does not instructs the endpoint to enter low-power sleep state, or any combination thereof.

57. In an automatic meter reading (AMR) system that includes a reader and a plurality of endpoints, each of the plurality of endpoints adapted to conduct radio frequency (RF) communication with the reader, a method of conducting communications, the method comprising:
initiating, by the plurality of endpoints, a communication session with the reader via an initial one-way communication; and
selectively initiating, by the reader, two way communication with individual ones of the plurality of endpoints in response to receipt of an initial one-way communication from each of those endpoints.

58. The method of claim 57, further comprising automatically synchronizing communication activity of the reader in time with communication activity of each of the individual ones of the plurality of endpoints with which the reader selectively communicates in two-way mode.

59. The method of claim 58, further comprising automatically synchronizes communication activity of the reader in channel hopping to match a channel hopping sequence of the communication activity of each of the individual ones of the plurality of endpoints with which the reader selectively communicates in two-way mode.

60. The method of claim 57, wherein for each endpoint, initiating the communication session with the reader includes transmitting a radio packet selected from the group consisting of: a radio packet comprising essentially an identification of the endpoint, or a standard consumption message (SCM).

61. The method of claim 57, further comprising indicating a next subsequent channel on which that endpoint will be listening in the initial one-way communication of each endpoint.

62. The method of claim 57, further comprising normally operating each endpoint in a receive mode during a time window that begins sometime after each message transmission receivable by the reader; and
operating the reader to selectively transmit an instruction to each endpoint in response to receiving a message transmission from the that endpoint, wherein the instruction is transmitted such that it can be received during a corresponding time window.

63. The method of claim 62, wherein operating the reader to selectively transmit the instruction includes transmitting an instruction of a type selected from the group consisting of: a sleep command, a command requesting a message from the endpoint, and a command to adjust an operating characteristic of the endpoint, or a command achieving any combination thereof.

64. The method of claim 62, wherein operating the reader to selectively transmit the instruction includes transmitting an instruction includes a command requesting a set of consumption information from the endpoint; and
operating the endpoint to respond to the command by transmitting a long message that includes the requested consumption information.

65. The method of claim 57, further comprising maintaining a database by the reader, the database including endpoint-specific information associated with each of the plurality of endpoints.

66. The method of claim 57, further comprising simultaneously receiving two-way communications from endpoints transmitting on different channels.

67. The method of claim 66, further comprising reserving certain time slots in which the reader receives messages sent by endpoints during the two-way communication.

68. The method of claim 57, further comprising instructing individual endpoints to schedule message transmissions such that messages from endpoints that are transmitted on adjacent channels are transmitted for reception by the reader at different reserved time slots.

* * * * *

UNITED STATES PATENT AND TRADEMARK OFFICE
CERTIFICATE OF CORRECTION

PATENT NO. : 8,390,472 B2  
APPLICATION NO. : 11/991677  
DATED : March 5, 2013  
INVENTOR(S) : Mark K. Cornwall Page 1 of 1

It is certified that error appears in the above-identified patent and that said Letters Patent is hereby corrected as shown below:

IN THE SPECIFICATION

Col. 1, lines 5-9: replace "This application claims priority to PCT Application No. PCT/US2006/035508 filed on Sep. 11, 2006, and U.S. patent application Ser. No. 11/222,657, filed Sep. 9, 2005, the disclosures of which are hereby incorporated by reference in their entirety." with -- This application is a national stage application of PCT Application No. PCT/US2006/035508, which was filed on September 11, 2006, which is a continuation of U.S. Patent Application Serial No. 11/222,657, which was filed on September 9, 2005, now U.S. Patent No. 7,535,378, the disclosures of which are hereby incorporated by reference in their entirety. --

Signed and Sealed this  
Eighth Day of March, 2016

Michelle K. Lee  
*Director of the United States Patent and Trademark Office*